United States Patent
Aronov et al.

(10) Patent No.: US 11,403,147 B2
(45) Date of Patent: Aug. 2, 2022

(54) METHODS AND APPARATUS TO IMPROVE CLOUD MANAGEMENT

(71) Applicant: VMware, Inc., Palo Alto, CA (US)

(72) Inventors: Evgeny Aronov, Sofia (BG); Ivo Petkov, Sofia (BG); Diana Kovacheva, Sofia (BG); Anna Delcheva, Sofia (BG); Zahari Ivanov, Sofia (BG); Georgi Mitsov, Sofia (BG); Alexander Dimitrov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 226 days.

(21) Appl. No.: 16/513,413

(22) Filed: Jul. 16, 2019

(65) Prior Publication Data
US 2021/0019195 A1 Jan. 21, 2021

(51) Int. Cl.
| G06F 9/50 | (2006.01) |
| G06F 9/48 | (2006.01) |
| G06F 8/61 | (2018.01) |
| H04L 67/10 | (2022.01) |

(52) U.S. Cl.
CPC .............. *G06F 9/5077* (2013.01); *G06F 8/61* (2013.01); *G06F 9/4856* (2013.01); *H04L 67/10* (2013.01)

(58) Field of Classification Search
CPC ......... G06F 9/45533–46; G06F 9/4856; G06F 9/5077; G06F 8/61; H04L 67/10
See application file for complete search history.

(56) References Cited

U.S. PATENT DOCUMENTS

| 2017/0134519 A1* | 5/2017 | Chen ........................ H04L 67/32 |
| 2018/0145884 A1* | 5/2018 | Stefanov ............. H04L 41/5048 |
| 2018/0157480 A1* | 6/2018 | Ivanov ...................... G06F 8/61 |
| 2018/0157512 A1* | 6/2018 | Savov .................... G06F 9/5027 |
| 2018/0157538 A1* | 6/2018 | Raikov ............... G06F 9/45558 |
| 2018/0157550 A1* | 6/2018 | Ivanov .................... H04L 41/12 |

(Continued)

OTHER PUBLICATIONS

Virtual Appliances for Deploying and Maintaining Software Constantine Sapuntzakis, David Brumley, Ramesh Chandra, Nickolai Zeldovich, et al. (Year: 2003).*

(Continued)

*Primary Examiner* — Charles M Swift
*Assistant Examiner* — Paul V Mills
(74) *Attorney, Agent, or Firm* — Hanley, Flight & Zimmerman, LLC

(57) ABSTRACT

Methods, apparatus, systems, and articles of manufacture are disclosed to improve cloud management. An example apparatus includes at least one processor, and memory including instructions that, when executed, cause the at least one processor to execute a cloud manager installer generated by a container platform manager, the cloud manager installer is to configure a cloud computing environment based on environment information, determine one or more virtual resources based on a blueprint, and deploy a cloud platform manager in the cloud computing environment to manage a lifecycle of an application executing in the cloud computing environment by provisioning the one or more virtual resources to the cloud computing environment, and installing the cloud platform manager in the cloud computing environment by storing the cloud manager installer and the blueprint in the cloud computing environment.

21 Claims, 13 Drawing Sheets

(56) References Cited

U.S. PATENT DOCUMENTS

| | | | |
|---|---|---|---|
| 2018/0159721 A1* | 6/2018 | Delcheva | G06F 8/65 |
| 2018/0165090 A1* | 6/2018 | Raghavan | G06F 8/60 |
| 2019/0065165 A1* | 2/2019 | Troutman | H04L 67/10 |
| 2019/0065277 A1* | 2/2019 | Raikov | H04L 41/0806 |
| 2020/0193221 A1* | 6/2020 | Aftab | G06N 20/00 |

OTHER PUBLICATIONS

Configuring vRealize Automation—7.1 VMware Inc (Year: 2016).*

* cited by examiner

```
cafe:
  type: "App.Container"
  data:
    name: "cafe"
    image: "${docker.registry.cafe}/cafe:${container.tag.cafe}"
    _cluster: 1
    env:
    - var: "DB_HOST"
      value: "database"
    - var: "DB_NAME"
      value: "@{databaseName}"
    - var: "DB_PASSWORD"
      value: "@{databasePassword}"
    - var: "DB_USER"
      value: "@{databaseUser}"
    - var: "REVERSE_PROXY_CERT"
      value: "@{vraCertificate}"
    - var: "REVERSE_PROXY_KEY"
      value: "@{vraPrivateKey}"
    - var: "MESSAGING_HOST"
      value: "messaging"
    - var: "MESSAGING_USER"
      value: "@{messagingUser}"
    - var: "MESSAGING_PASSWORD"
      value: "@{messagingPassword}"
    - var: "MESSAGING_CERT"
      value: "@{messagingCertificate}"
    - var: "VMIDENTITY_ADMIN_HOST"
      value: "@{vidmAddress}"
    - var: "VMIDENTITY_ADMIN_USER"
      value: "@{vidmAdminUser}"
    - var: "VMIDENTITY_ADMIN_PASSWORD"
      value: "@{vidmAdminUserPassword}"
    - var: "ADMIRAL_URL"
      value: "https://container-service"
    - var: "ADMIRAL_USER"
      value: "@{admiralUser}"
    - var: "ADMIRAL_PASSWORD"
      value: "@{admiralPassword}"
    - var: "ADMIRAL_CERT"
      value: "@{vraCertificate}"
    - var: "ENCRYPTION_KEY"
      value: "@{encryptionKey}"
    networks:
    - name: "vRANetwork"
    publish_all: false
    links:
    - service: "database"
      alias: "database"
    - service: "messaging"
      alias: "messaging"
    dependsOn:
    - "database"
    - "messaging"
```

METHODS AND APPARATUS TO IMPROVE CLOUD MANAGEMENT

FIELD OF THE DISCLOSURE

This disclosure relates generally to cloud computing and, more particularly, to methods and apparatus to improve cloud management.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 5 depicts a portion of an example blueprint in human-readable form.

Figure 1:
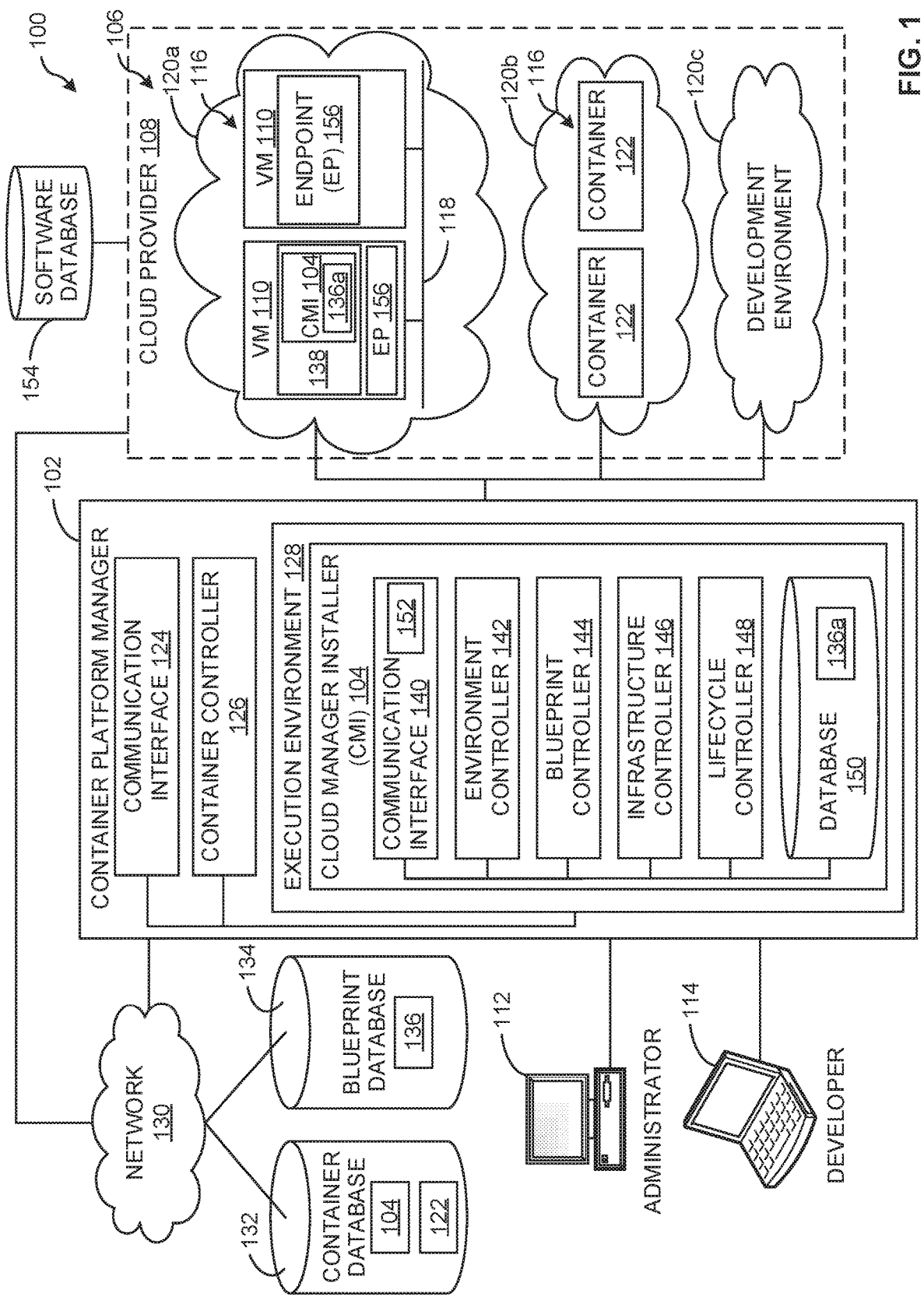
FIG. 1 is a schematic illustration of an example system including an example container platform manager executing an example cloud manager installer to deploy and manage an example cloud computing application.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing is based on the deployment of many physical resources across a network, virtualizing the physical resources into virtual resources, and provisioning the virtual resources to perform cloud computing services and applications. In some instances, a virtual machine is generated based on a compilation of the virtual resources based on the virtualization of corresponding physical resources. A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy. CPU speed, memory, storage, security, and/or power options).

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources (e.g., the physical hardware resources) of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™ OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform.

Prior techniques to deploy and manage the cloud computing platforms may include using a cloud management system (CMS) to establish a virtual environment of the cloud computing platform, which leaves an end user to perform other tasks, such as provisioning virtual resources to the cloud computing platform. A CMS may be used to monitor and/or otherwise manage a cloud computing platform including monitoring virtual resources, managing firmware and/or software associated with the virtual resources, etc. In some instances, the end user generates a custom installer, or installer application, that includes computer-executable scripts to deploy the CMS and/or the cloud computing platform. However, generating a custom installer necessitates substantial effort and extensive knowledge of customer requirements, specifications, etc.

Prior techniques tailor the CMS for a particular version of a cloud computing platform. Typically, the CMS may not be used for different customers, end users, etc., and/or the CMS may not be used for different versions of the cloud computing platform. For example, deploying the CMS can include a team of developers to build and generate an installer (e.g., a CMS installer) to deploy a specific version of the CMS. In such examples, the team of developers can generate the installer to include the computer-executable scripts to deploy a configured virtual environment and a configuration console or manager that is developed for the particular version of the CMS to monitor the configured virtual environment. However, an update to the cloud computing platform (e.g., the virtual environment, the CMS, etc.) may result in a new version of the cloud computing platform that includes new or modified ones of physical hardware resources, virtual resources, and/or corresponding firmware or software upgrades associated with the cloud computing platform. Prior techniques may facilitate the update to the cloud computing platform by generating another custom CMS installer to deploy the updates to the virtual environment and/or the CMS, which, in some instances, require extensive and substantial efforts to build, test, and execute. However, new or modified computer-executable scripts may be needed to deploy updates to the physical hardware resources, the virtual resources, and/or corresponding firmware and/or software.

Methods and apparatus disclosed herein provide for automation of deployment and management tasks, such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to the CMS (e.g., vRealize® Automation™ (vRA) Cloud Automation Software from VMware®, Inc., Cloud Assembly from VMware®, Inc., etc.), interfaces, portals, etc., disclosed herein may be utilized individually and/or in any combination. For example, all or a subset of the described improvements may be utilized.

Examples disclosed herein include executing a containerized application corresponding to an example cloud platform manager (CPM) installer to establish a cloud computing platform and provision a CMS in the cloud computing platform. The example CPM installer improves conventional CMS installers by deploying the CMS through the configuration of at least one of a virtual environment to execute the application, virtual resources to execute the application, or the CMS itself to manage a lifecycle of the application executing in the virtual environment. For example, the lifecycle of the application can include the configuration of the application, the provisioning and/or allocation of virtual resources to execute the application, the execution of the application, and/or the decommissioning or termination of the application that can include releasing the virtual resources from the application and back to a virtual resource pool. Compared to prior techniques where the CMS installer only configured the virtual environment, methods and apparatus disclosed herein facilitate the configuration, deployment, and management of the virtual environment and an application executed by virtual resources in the virtual environment, which includes provisioning the virtual resources.

In some disclosed examples, the CPM installer establishes the virtual environment and corresponding components based on a blueprint. In some disclosed examples, the CPM installer generates a blueprint by obtaining a blueprint from a blueprint database, modifying the obtained blueprint, etc. In such disclosed examples, the blueprint can include virtual environment information, virtual resource information, firmware and/or software information, etc., that can be used to establish, execute, and manage a cloud computing platform. Accordingly, the example CPM installer can deploy a complete cloud computing platform including a fully-configured and operational CMS based on the blueprint.

In some disclosed examples, the CPM installer embeds itself and/or otherwise provisions a copy of the CPM installer within the cloud computing platform. In such disclosed examples, the CMS can execute the CPM installer to manage one or more blueprints of the cloud computing platform. For example, the CPM installer can be executed to identify a modification to a blueprint, identify a virtual resource affected by the blueprint, and implement the modification by, for example, re-deploying the virtual resource with the modification. Accordingly, the cloud computing platform can be modified, upgraded, and/or otherwise managed by changing a blueprint associated with the cloud computing platform and re-executing the CPM installer using the modified blueprint instead of developing a different CMS installer to facilitate the modifications.

FIG. 1 is a schematic illustration of an example system 100 including an example container platform manager 102 executing an example cloud manager installer 104 to deploy and manage an example virtual environment (e.g., a virtual computing environment) 106 hosted by an example cloud provider 108. As used herein, the system 100 facilitates management of the cloud provider 108 and does not include the cloud provider 108. Alternatively, the cloud provider 108 could be included in the system 100.

In the illustrated example of FIG. 1, the cloud provider 108 is a cloud computing platform provider that provisions virtual computing resources (e.g., virtual machines, or "VMs," 110) that may be accessed by users of the cloud provider 108 (e.g., users associated with an example administrator 112 and/or an example developer 114) and/or other programs, software, device, etc.

An example application 116 of FIG. 1 includes multiple VMs 110. The VMs 110 of FIG. 1 provide different functions within the application 116 (e.g., services, portions of the application 116, etc.). One or more of the VMs 110 of the illustrated example are customized by the administrator 112 and/or the developer 114 of the application 116 relative to a stock or out-of-the-box (e.g., commonly available purchased copy) version of the services and/or application components. In FIG. 1, the VMs 110 are communicatively coupled to each other via an example network (e.g., a virtualized network) 118. Additionally, the services executing on the VMs 110 may have dependencies on other ones of the VMs 110. For example, a first virtual resource associated with a first one of the VMs 110 may be dependent and/or otherwise have a dependency on a second virtual resource associated with the first one of the VMs 110, a second one of the VMs 110, etc.

As illustrated in FIG. 1, the cloud provider 108 may provide multiple deployment environments 120a-c, for example, for development, testing, staging, and/or production of applications. In FIG. 1, the deployment environments 120a-c include a first example deployment environment 120a to execute the application 116, a second example deployment environment 120b to execute example containers (e.g., container images) 122, and a third example deployment environment 120c executing as a development environment. Alternatively, fewer or more than the deployment environments 120a-c depicted in FIG. 1 may be used.

The administrator 112, the developer 114, other programs, and/or other devices may access services from the cloud provider 108, for example, via Representational State Transfer (REST) Application Programming Interfaces (APIs) and/ or via any other client-server communication protocol. Example implementations of a REST API for cloud computing services include a vCloud Automation Center™ (vCAC) and/or vRealize® Automation™ (vRA) API and a vCloud Director™ API available from VMware®, Inc. The cloud provider 108 provisions virtual computing resources (e.g., the VMs 110) to provide the deployment environments 120a-c in which the administrator 112 and/or the developer 114 can deploy multi-tier application(s), such as the application 116. One particular example implementation of a deployment environment that may be used to implement the deployment environments 120a-c of FIG. 1 is vCAC or vRA cloud computing services available from VMware®, Inc.

In some examples disclosed herein, a lighter-weight virtualization is employed by using the containers 122 in place of the VMs 110 in the second deployment environment 120b. Containers 122 or container images are software constructs that run on top of a host operating system without the need for a hypervisor or a separate guest operating system. Unlike the VMs 110, the containers 122 do not instantiate their own operating systems. Like the VMs 110, the containers 122 are logically separate from one another. Numerous ones of the containers 122 can run on a single computer, processor system, and/or in the same deployment environment 120b. Also, like the VMs 110, the containers 122 can execute instances of applications or programs (e.g., the application 116) separate from application/program instances executed by the other containers 122 in the same deployment environment 120b.

In the illustrated example of FIG. 1, the system 100 includes the container platform manager 102 to obtain, configure, and/or provision the containers 122 to the virtual computing environment 106. In some examples, the container platform manager 102 executes the cloud manager installer 104 and/or one or more of the containers 122. For example, the cloud manager installer 104 can be a container-based application (e.g., a containerized application) including one or more of the containers 122. In other examples, the cloud manager installer 104 may be a non-containerized application. In FIG. 1, the container platform manager 102 includes a first example communication interface 124, an example container controller 126, and an example execution environment 128.

In the illustrated example of FIG. 1, the container platform manager 102 includes the first communication interface 124 to facilitate communication with an example network 130. In some examples, the first communication interface 124 obtains data from and/or transmits data to an example container database 132 and/or an example blueprint database 134. In FIG. 1, the first communication interface 124 can implement a web server that receives and/or otherwise obtains the cloud manager installer 104 and/or the containers 122 from the container database 132, an example blueprint 136 from the blueprint database 134, etc. In FIG. 1, in response to the blueprint 136 being obtained from the blueprint database 134, an example instance of the blueprint 136a is stored. For example, future modifications to the instance of the blueprint 136a may not alter, adjust, and/or otherwise affect the blueprint 136 stored in the blueprint database 134. In FIG. 1, the first communication interface 124 may obtain and/or transmit data formatted as HTTP messages. However, any other message format and/or protocol may additionally or alternatively be used such as, for example, a file transfer protocol (FTP), a simple message transfer protocol (SMTP), an HTTP secure (HTTPS) protocol, etc.

The network 130 of the illustrated example of FIG. 1 is the Internet. However, the network 130 may be implemented using any suitable wired and/or wireless network(s) including, for example, one or more data buses, one or more Local Area Networks (LANs), one or more wireless LANs, one or more cellular networks, one or more private networks, one or more public networks, etc. The network 130 enables the container platform manager 102 and/or the cloud provider 108 to be in communication with the container database 132 and/or the blueprint database 134.

The system 100 of FIG. 1 includes the container database 132 to record and/or otherwise store data (e.g., the cloud manager installer 104, the one or more of the containers 122, etc.). The container database 132 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The container database 132 may additionally or alternatively be implemented by one or more double data rate (DDR) memories, such as DDR, DDR2, DDR3, DDR4, mobile DDR (mDDR), etc. The container database 132 may additionally or alternatively be implemented by one or more mass storage devices such as hard disk drive(s), compact disk drive(s), digital versatile disk drive(s), solid-state disk drive(s), etc. While in the illustrated example the container database 132 is illustrated as a single database, the container database 132 may be implemented by any number and/or type(s) of databases. Furthermore, the data stored in the container database 132 may be in any data format such as, for example, binary data, comma delimited data, tab delimited data, structured query language (SQL) structures, etc.

The system 100 of FIG. 1 includes the blueprint database 134 to record and/or otherwise store data (e.g., the blueprints 136 including one or more basic blueprints and/or one or more multi-machine blueprints). The blueprint database 134 may be implemented by a volatile memory (e.g., a SDRAM, DRAM, RDRAM, etc.) and/or a non-volatile memory (e.g., flash memory). The blueprint database 134 may additionally or alternatively be implemented by one or more DDR memories, such as DDR, DDR2, DDR3, DDR4, mDDR, etc. The blueprint database 134 may additionally or alternatively be implemented by one or more mass storage devices such as hard disk drive(s), compact disk drive(s), digital versatile disk drive(s), solid-state disk drive(s), etc. While in the illustrated example the blueprint database 134 is illustrated as a single database, the blueprint database 134 may be implemented by any number and/or type(s) of databases. Furthermore, the data stored in the blueprint database 134 may be in any data format such as, for example, binary data, comma delimited data, tab delimited data. SQL structures, etc.

In the illustrated example of FIG. 1, the container platform manager 102 includes the container controller 126 to facilitate computing operations associated with a configuration and/or an execution of a containerized application. In some examples, the container controller 126 configures a containerized application. For example, the container controller 126 may configure and/or otherwise modify one of the containers 122 obtained from the container database 132. In other examples, the container controller 126 may configure and/or otherwise modify the cloud manager installer 104. In some examples, the container controller 126 invokes the first communication interface 124 to obtain and/or transmit data to the cloud provider 108. For example, the container controller 126 may invoke the first communication interface 124 to transmit data to the cloud provider 108 to establish the virtual computing environment 106, provision the VMs 110 and/or the containers 122, etc. In other examples, the container controller 126 can invoke the first communication interface 124 to direct the cloud provider 108 to provision one of the blueprints 136 in the virtual computing environment 106 by storing the provisioned blueprint in one of the VMs 110 for further processing.

In the illustrated example of FIG. 1, the container platform manager 102 includes the execution environment 128 to process and/or otherwise execute one or more containers, such as the cloud manager installer 104 and/or the containers 122. In some examples, the execution environment 128 corresponds to a portion of at least one of one or more processors or storage space on one or more mass storage devices. In some examples, the execution environment 128 can be executed on a VM that emulates all or a portion of the one or more processors and/or the one or more mass storage devices.

In the illustrated example of FIG. 1, the cloud manager installer 104 orchestrates deployment of multi-tier applications, such as the application 116, onto one of the deployment environments 120a-c. In some examples, the cloud manager installer 104 configures and deploys an example cloud platform manager 138 to the virtual computing environment 106. In some examples, the cloud manager installer 104 obtains virtual environment information (e.g., from the administrator 112, the developer 114, an end user, a database, etc.) and establishes the virtual computing environment 106 based on the virtual environment information. In some examples, in response to establishing the virtual computing environment 106, the cloud manager installer 104 can provision virtual resources, such as compute, storage, security, network, etc., to build and/or otherwise provision the VMs 110 to the virtual computing environment 106.

In some examples, the cloud manager installer 104 deploys the cloud platform manager 138 to manage a lifecycle of the application 116 and/or, more generally, to monitor and/or manage the virtual computing environment 106. In some examples, the cloud manager installer 104 performs one or more of the above-described operations based on the blueprint 136a (e.g., the instance of the blueprint 136 from the blueprint database 134). In the illustrated example of FIG. 1, the cloud manager installer 104 includes a second example communication interface 140, an example environment controller 142, and example blueprint controller 144, an example infrastructure controller 146, an example lifecycle controller 148, and an example database 150.

The cloud manager installer 104 of FIG. 1 includes the second communication interface 140 to provision and configure the VMs 110 in the virtual computing environment 106. The second communication interface 140 provides an example communication abstraction layer 152 by which the cloud manager installer 104 may communicate with a heterogeneous mixture of the cloud provider 108 and the deployment environments 120a-c. In FIG. 1, the communication abstraction layer 152 corresponds to one or more APIs. For example, the second communication interface 140 may invoke the cloud provider 108 to execute a computing action in connection with at least one of the deployment environments 120a-c by triggering, calling, and/or otherwise invoking one or more APIs.

The cloud manager installer 104 of FIG. 1 includes the environment controller 142 to configure and establish the virtual computing environment 106. In some examples, the environment controller 142 obtains environment information (e.g., virtual environment information). For example, the environment controller 142 may obtain credentials (e.g., a user name, a password, etc.) associated with an account of the administrator 112, the developer 114, etc., of the cloud provider 108. In other examples, the environment controller 142 can obtain a security certificate, server-identifying information (e.g., a uniform resource locator (URL), an Internet Protocol (IP) address, an IP port, etc.), etc. In some examples, the environment controller 142 directs the cloud provider 108 to establish the virtual computing environment 106 based on the environment information by instructing the second communication interface 140 to transmit the environment information and corresponding commands, instructions, etc., to the cloud provider 108 via the communication abstraction layer 152.

The cloud manager installer 104 of FIG. 1 includes the blueprint controller 144 to manage the obtaining, creation, and/or modification of the blueprints 136a. In some examples, the blueprints 136a include basic blueprints that specify a logical topology of an application to be deployed. A basic blueprint is a definition of policies (e.g., hardware policies, security policies, network policies, etc.) for a single machine (e.g., a single virtual machine such as a web server virtual machine and/or container). In some examples, the blueprints 136a include multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). Accordingly, the blueprint controller 144 facilitates more efficient management of multiple virtual machines and/or containers than manually managing (e.g., deploying) basic blueprints individually. Example management of multi-machine blueprints is described in further detail in conjunction with FIG. 2.

The blueprint 136a of FIG. 1, also referred to herein as an application blueprint, generally captures the structure of an application as a collection of application components executing on virtual computing resources. For example, the blueprint 136a obtained by and/or generated by the blueprint controller 144 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications, such as the application 116, may be distributed across multiple VMs, such as the VMs 110. Thus, in the example described above, the term "application" refers to the entire online store application, including application server and database components, rather than just the web application itself. In some instances, the application may include the underlying hardware and/or virtual computing hardware utilized to implement the components.

The example blueprint controller 144 of FIG. 1 additionally annotates the blueprints 136a (e.g., basic blueprints and/or multi-machine blueprints) to control how workflows associated with the basic blueprints and/or multi-machine blueprints are executed. For example, the blueprint controller 144 may store an obtained one of the blueprints 136a, a modified one of the blueprints 136a, an annotated one of the blueprints 136a, etc., in the database 150. As used herein, a workflow is a series of actions and decisions to be executed in a virtual computing platform, such as the virtual computing environment 106. For example, the blueprint controller 144 may generate a workflow based on the blueprint 136a to provision the virtual computing environment 106 with the VMs 110, the containers 122, and/or corresponding firmware and/or software.

The blueprint 136a of FIG. 1 may be assembled from items (e.g., templates) from the blueprint database 134, which can include a listing of available virtual computing resources (e.g., VMs, networking, storage, etc.) that may be provisioned from the cloud provider 108 and available application components (e.g., software services, scripts, code components, application-specific packages) that may be installed on the provisioned virtual computing resources. The blueprint database 134 may be pre-populated and/or customized by the administrator 112 (e.g., IT (Information Technology) or system administrator) that enters in specifications, configurations, properties, and/or other details about items in the blueprint database 134. Based on the application, the blueprints 136a may define one or more dependencies between application components to indicate an installation order of the application components during deployment. For example, since a load balancer usually cannot be configured until a web application is up and running, the developer 114 may specify a dependency from an Apache service to an application code package.

The cloud manager installer 104 of FIG. 1 includes the database 150 to record data (e.g., environment information, virtual resource information, the blueprint 136a, etc.). The database 150 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 150 may additionally or alternatively be implemented by one or more double data rate (DDR) memories, such as DDR, DDR2, DDR3, DDR4, mobile DDR (mDDR), etc. The database 150 may additionally or alternatively be implemented by one or more mass storage devices such as hard disk drive(s), compact disk drive(s), digital versatile disk drive(s), solid-state disk drive(s), etc. While in the illustrated example the database 150 is illustrated as a single database, the database 150 may be implemented by any number and/or type(s) of databases. Furthermore, the data stored in the database 150 may be in any data format such as, for example, binary data, comma delimited data, tab delimited data, structured query language (SQL) structures, etc.

The cloud manager installer 104 of FIG. 1 includes the infrastructure controller 146 to generate a deployment plan based on the blueprint 136a that includes deployment settings for the blueprint 136a (e.g., virtual computing resources' cluster size, CPU, memory, networks, etc.) and an execution plan of tasks having a specified order in which virtual computing resources are provisioned and application components are installed, configured, and started. The infrastructure controller 146 generates the deployment plan to provide an IT administrator with a process-oriented view of the blueprint 136a that indicates discrete actions to be performed to deploy the application 116. Different deployment plans may be generated from a single blueprint 136a to test prototypes (e.g., new application versions), to scale up and/or scale down deployments, and/or to deploy the application to different ones of the deployment environments 120a-c (e.g., testing, staging, production). The infrastructure controller 146 can separate and distribute the deployment plan as local deployment plans having a series of tasks to be executed by the VMs 110 provisioned from the deployment environments 120a-c. Each VM 110 can coordinate execution of each task with a centralized deployment module (e.g., the infrastructure controller 146, an example endpoint 156, etc.) to ensure that tasks are executed in an order that complies with dependencies specified in the blueprint 136a. For example, the infrastructure controller 146 can generate the endpoints 156 of FIG. 1 to facilitate the execution of one or more tasks associated with the virtual computing environment 106. In other examples, the environment controller 142 can generate the endpoints 156 based on virtual environment information.

The infrastructure controller 146 of FIG. 1 executes the deployment plan based on the blueprint 136a by communicating with the cloud provider 108 via the second communication interface 140 to provision and configure the VMs 110 in the deployment environments 120a-c. The infrastructure controller 146 provides each VM 110 with a series of tasks specific to the receiving VM 110 (herein referred to as a "local deployment plan"). Tasks are executed by the VMs 110 to install, configure, and/or start one or more application components. For example, a task may be a script that, when executed by a VM 110, causes the VM 110 to retrieve and install particular software packages from an example software database 154. The infrastructure controller 146 coordinates with the VMs 110 to execute the tasks in an order that observes installation dependencies between VMs 110 according to the deployment plan.

The system 100 of FIG. 1 includes the software database 154 to record and/or otherwise store data (e.g., software packages, firmware packages, firmware and/or software drivers, etc.). The software database 154 may be implemented by a volatile memory (e.g., a SDRAM, DRAM, RDRAM, etc.) and/or a non-volatile memory (e.g., flash memory). The software database 154 may additionally or alternatively be implemented by one or more DDR memories, such as DDR, DDR2, DDR3, DDR4, mDDR, etc. The software database 154 may additionally or alternatively be implemented by one or more mass storage devices such as hard disk drive(s), compact disk drive(s), digital versatile disk drive(s), solid-state disk drive(s), etc. While in the illustrated example the software database 154 is illustrated as a single database, the software database 154 may be implemented by any number and/or type(s) of databases. Furthermore, the data stored in the software database 154 may be in any data format such as, for example, machine-readable executables, binary data, comma delimited data, tab delimited data. SQL structures, etc.

The cloud manager installer 104 of FIG. 1 includes the lifecycle controller 148 to monitor and/or modify (e.g., scale, upgrade, etc.) the application 116 and/or, more generally, the virtual computing environment 106, after the application 116 has been deployed. In some examples, after the cloud provider 108 instantiates the virtual computing environment 106, the deployment environments 120a-c, etc., the container platform manager 102 installs the cloud platform manager 138 by copying an instance of the cloud manager installer 104 and the blueprint 136a stored in the database 150 in one or more of the VMs 110.

In the illustrated example of FIG. 1, the VM 110 executes the cloud platform manager 138 to manage a lifecycle of the application 116. For example, the cloud platform manager 138 can execute a locally stored instance of the cloud manager installer 104 to invoke the lifecycle controller 148 to alter and/or otherwise modify the application 116 and/or, more generally, the virtual computing environment 106 based on the blueprint 136a.

In some examples, the lifecycle controller 148 adjusts the application 116 based on the blueprint 136a being modified. For example, the administrator 112, the developer 114, etc., may modify the blueprint 136a, where the modification is associated with a change in a virtual resource, the VMs 110, the containers 122, etc. In some examples, the lifecycle controller 148 extracts blueprint modification information (BMI) from a request to modify the blueprint. In such examples, the BMI can include one or more modifications to a virtual resource (e.g., the VMs 110, the containers 122, a component server, etc.). In other examples, the lifecycle controller 148 can identify or determine BMI by comparing two blueprints and identifying the differences as BMI. For example, the lifecycle controller 148 can identify a modified version of the blueprint 136a as a desired state, where a current or instant state of a corresponding resource is an actual state. In such examples, the lifecycle controller 148 can be invoked to execute actions (e.g., corrective actions) to adjust the resource having the actual state match the desired state of the modified version of the blueprint 136a.

In some examples, the lifecycle controller 148 determines whether the BMI is valid. For example, the lifecycle controller 148 can compare a modification included in the BMI associated with the virtual resource to a definition, a policy, etc., of the virtual resource in the blueprint database 134, or a different database or repository. In some examples, in response to determining that the modification is not valid based on the comparison, the lifecycle controller 148 generates an alert to the administrator 112, the developer 114, a computing device (e.g., a personal computer, a server, etc.) associated with the administrator 112, the developer 114, etc., that requested to modify the blueprint 136a, where the alert is indicative that the modification is not valid. In such examples, the lifecycle controller 148 can include in the alert a suggestion, a recommendation, etc., to modify the request to facilitate a valid modification.

In some examples, in response to determining that the modification is valid based on the comparison, the lifecycle controller 148 invokes the endpoint (e.g., a virtual infrastructure endpoint) 156 to perform and/or otherwise facilitate the execution of the modification. In an example where the modification is a software upgrade to a load balancer associated with the network 118 of the application 116, the endpoint 156 may install the software upgrade on the load balancer and restart and/or otherwise redeploy the load balancer with the software upgrade. For example, the endpoint 156 may facilitate the upgrade via one or more agents (e.g., software agents) deployed on component servers associated with the VMs 110. In FIG. 1, the infrastructure controller 146 can generate, configure, and deploy the endpoint 156. In such examples, the lifecycle controller 146 can adjust the actual state of the load balancer associated with the network 118 to the desired state defined by the modification (e.g., the modified version of the blueprint 136a).

In some examples, the lifecycle controller 148 adjusts the application 116 in response to receiving a different one of the blueprints 136a than the blueprint 136a stored locally in the VM 110. In an example where the blueprint 136a stored in the VM 110 is a first blueprint, the administrator 112, the developer 114, etc., may provision a second blueprint different from the first blueprint to the VM 110. The lifecycle controller 148 may compare the second blueprint to the first blueprint. The lifecycle controller 148 may determine that the second blueprint is different from the first blueprint and includes a modification based on the comparison, where the modification is associated with a change in a virtual resource, the VMs 110, the containers 122, etc. In such examples, the lifecycle controller 148 can determine whether the modification is valid. For example, the lifecycle controller 148 can compare the modification associated with the virtual resource to a definition, a policy, etc., of the virtual resource in the blueprint database 134, or a different database or repository. In response to determining that the modification is valid based on the comparison, the lifecycle controller 148 can replace the first blueprint with the second blueprint, integrate the changes by modifying the first blueprint to comport with the second blueprint, etc. The lifecycle controller 148 may invoke the endpoint 156 to perform the modification. For example, the lifecycle controller 148 may redeploy one or more virtual resources, the VMs 110, etc., based on the modification.

In the illustrated example of FIG. 1, the endpoint 156 can be a software account or entity that has access to configuration information of the VMs 110 and may execute instructions in the VMs 110. For example, the endpoint 156 may be provided with root access or administrator-level access to the VMs 110. Examples disclosed herein may request information from the VMs 110 and/or instruct the VMs 110 to execute instructions via the respective endpoint 156. For example, the endpoint 156 executing on the VM 110 may expose one or more APIs for providing commands to the VM 110 using the exposed API(s).

While an example manner of implementing the cloud manager installer 104 and/or the container platform manager 102 is illustrated in FIG. 1, one or more of the elements, processes, and/or devices illustrated in FIG. 1 may be combined, divided, re-arranged, omitted, eliminated, and/or implemented in any other way. Further, the blueprint 136a, the second communication interface 140, the environment controller 142, the blueprint controller 144, the infrastructure 146, the lifecycle controller 148, the database 150, the communication abstraction layer 152 and/or, more generally, the cloud manager installer 104, and/or the first communication interface 124, the container controller 126, the execution environment 128, and/or, more generally, the example container platform manager 102 of FIG. 1 may be implemented by hardware, software, firmware, and/or any combination of hardware, software, and/or firmware. Thus, for example, any of the blueprint 136a, the second communication interface 140, the environment controller 142, the blueprint controller 144, the infrastructure 146, the lifecycle controller 148, the database 150, the communication abstraction layer 152 and/or, more generally, the cloud manager installer 104, and/or the first communication interface 124, the container controller 126, the execution environment 128, and/or, more generally, the example container platform manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the blueprint 136a, the second communication interface 140, the environment controller 142, the blueprint controller 144, the infrastructure 146, the lifecycle controller 148, the database 150, the communication abstraction layer 152 and/or, more generally, the cloud manager installer 104, and/or the first communication interface 124, the container controller 126, the execution environment 128, and/or, more generally, the example container platform manager 102 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example cloud manager installer 104 and/or the container platform manager 102 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
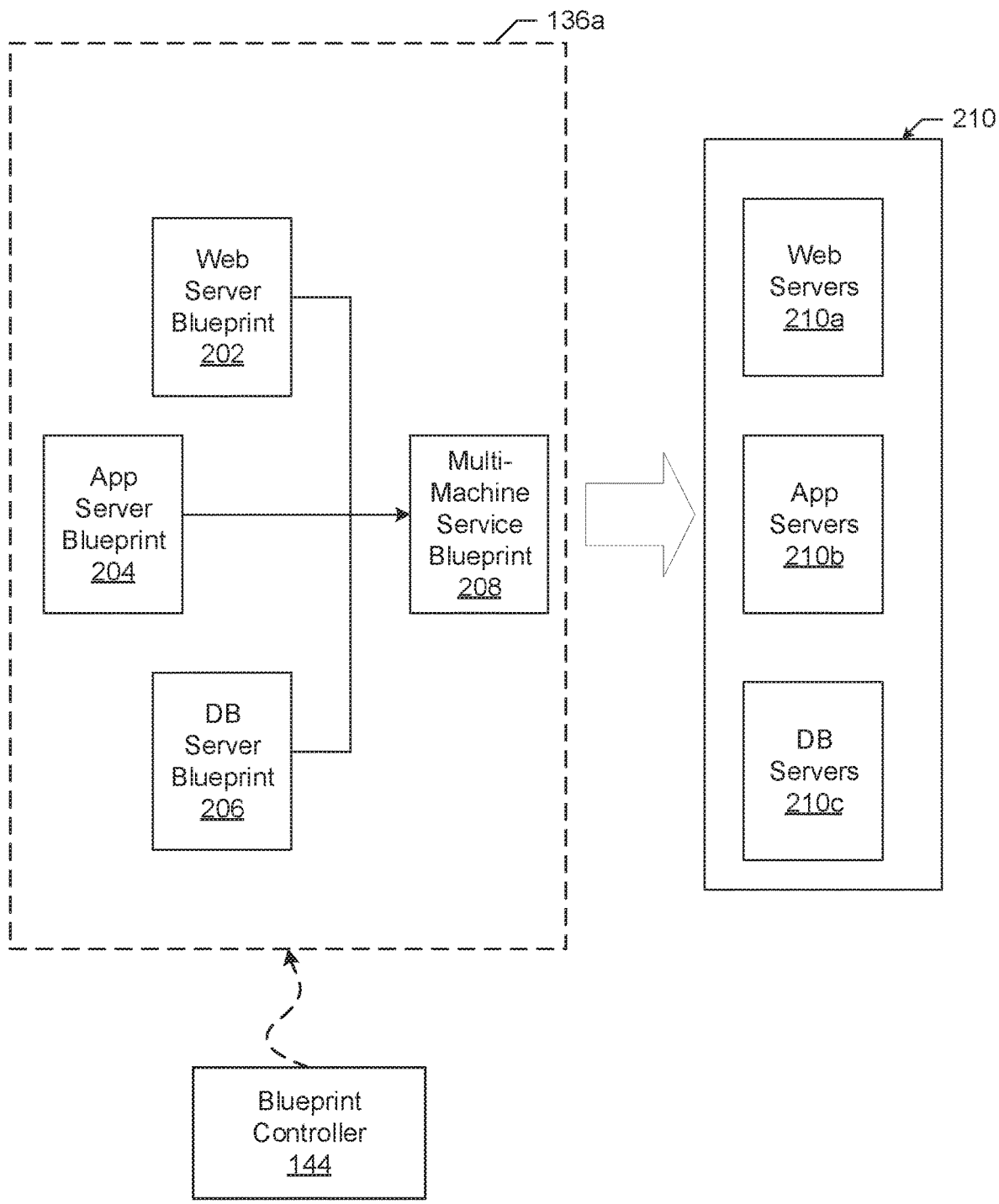
FIG. 2 illustrates an example generation of a multi-machine blueprint by the example cloud manager installer of FIG. 1.

FIG. 2 illustrates an example implementation of the blueprint 136a as a multi-machine blueprint generated by the blueprint controller 144 of FIG. 1. In the illustrated example of FIG. 2, three example basic blueprints 202, 204, 206 including an example web server blueprint 202, an example application (App) server blueprint 204, and an example database (DB) server blueprint 206 have been created (e.g., by the blueprint controller 144). For example, the web server blueprint 202, the application server blueprint 204, and the database server blueprint 206 may define the components of an e-commerce online store.

In some examples, the blueprint controller 144 provides a user interface for a user of the blueprint controller 144 (e.g., the administrator 112, the developer 114, etc.) to specify blueprints (e.g., basic blueprints and/or multi-machine blueprints) to be assigned to an instance of an example multi-machine blueprint 208. For example, the user interface may include a list of previously generated basic blueprints (e.g., the web server blueprint 202, the application server blueprint 204, the database server blueprint 206, etc.) to allow selection of desired blueprints. In such examples, the list of previously generated basic blueprints can be obtained from the blueprint database 134 of FIG. 1.

In the illustrated example of FIG. 2, the blueprint controller 144 combines the selected blueprints into the definition of the multi-machine blueprint 208 and stores information about the blueprints in a multi-machine blueprint record defining the multi-machine blueprint 208. For example, the blueprint controller 144 may store the multi-machine blueprint record in the database 150 of the cloud manager installer 104 of FIG. 1. In some examples, the blueprint controller 144 additionally includes a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208. In such examples, multiple instances of the VM 110, the containers 122, and/or virtual resources including compute, storage, security, network, etc., virtual resources can be specified.

Accordingly, any number of virtual machines (e.g., the VMs 110 of FIG. 1, virtual machines associated with the blueprints in the multi-machine blueprint 208, etc.) and/or containers (e.g., the containers 122 of FIG. 1) may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 110 that include example virtualized web server(s) 210a, example virtualized application server(s) 210b, and example virtualized database server(s) 210c. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 of the illustrated example of FIG. 2 maintains the reference to the basic blueprints 202, 204, 206. Accordingly, changes made to the blueprints (e.g., by the blueprint controller 144, by the lifecycle controller 148 of FIG. 1 after deployment of the application 116, by a manager of the blueprints different than the manager of the multi-machine blueprint 208, etc.) may be incorporated into future provisioning of the multi-machine blueprint 208. Accordingly, an administrator maintaining the source blueprints (e.g., the administrator 112 of FIG. 1, an administrator charged with managing the web server blueprint 202, etc.) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. In such examples, the lifecycle controller 148 can determine that a modified blueprint identifies the disk image to be updated and the lifecycle controller 148 can invoke the endpoint 156 to update the disk image to have the operating system update.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow executed by the infrastructure controller 146 of FIG. 1 may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
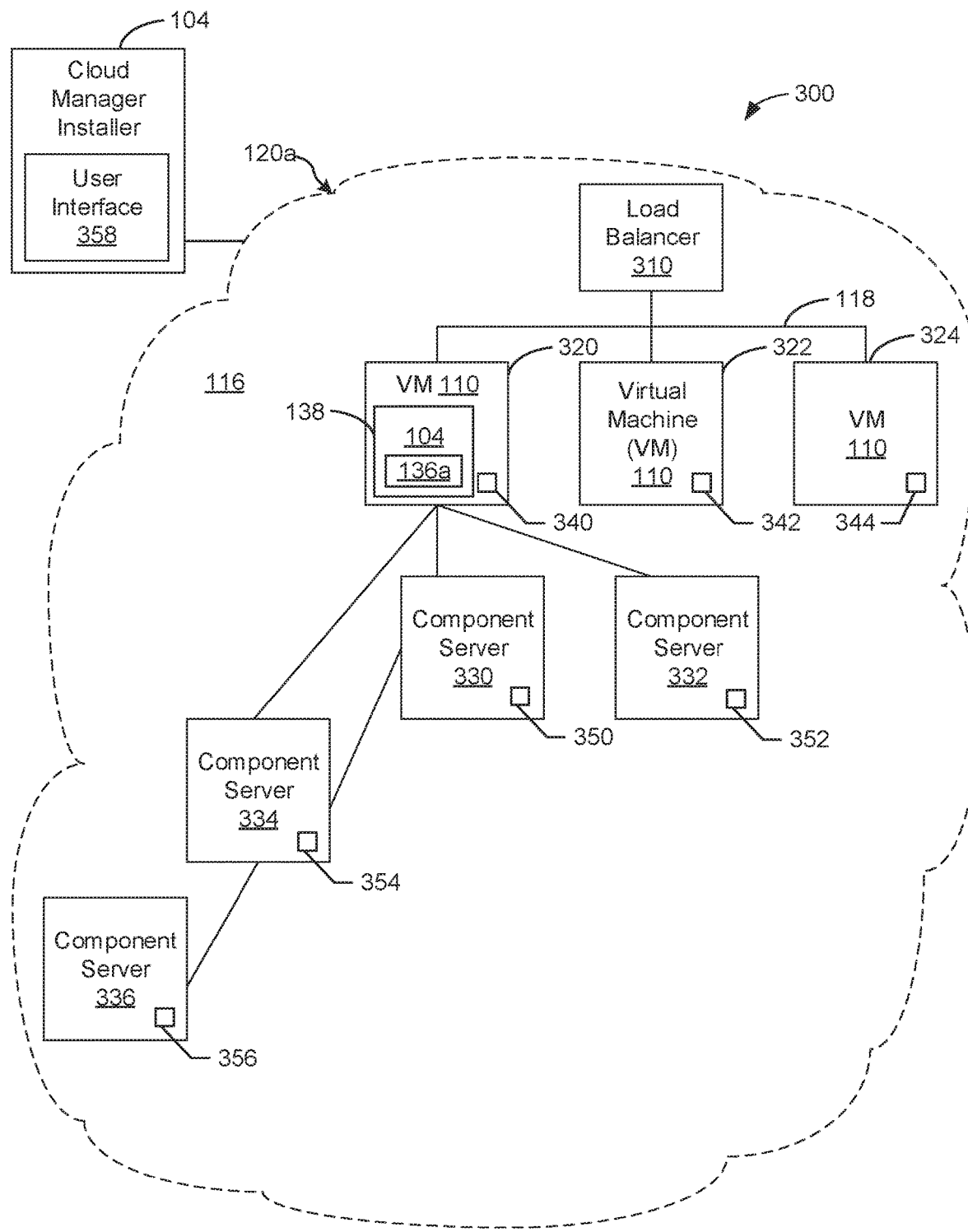
FIG. 3 is a schematic illustration of a deployed cloud platform manager and an associated server acting as a host for deployment of component servers for an end user.

FIG. 3 illustrates an example installation 30 of deployed appliances or virtual appliances (vAs) (e.g., the VMs 110 and/or the containers 122 of FIG. 1) and associated virtualized servers acting as hosts for deployment of component servers (e.g., a Web server, an application server, a database server, etc.) for a customer or end user. In FIG. 3, the installation 300 corresponds to the application 116 of FIG. 1 executing in the deployment environment 120a. The vAs can be deployed as an automation tool, for example, used to deliver and manage VMs and associated applications for on-premise automation and/or handling of external cloud resources (e.g., Microsoft Azure™, Amazon Web Services™, etc.). For example, the cloud platform manager 138 deployed by the cloud manager installer 104 of FIG. 1 can be a vA.

As shown in the example of FIG. 3, the deployment or installation 300 includes an example load balancer (LB) 310 to assign tasks and/or manage access among a plurality of example vAs 320, 322, 324 including a first example vA 320, a second example vA 322, and a third example vA 324. Each vA 320-324 is a deployed one of the VMs 110 and/or the containers 122. In FIG. 3, the LB 310 can also manage network load balancing by adjusting traffic of the network 118 of FIG. 1.

In the illustrated example of FIG. 3, the first vA 320 is the VM 110 of FIG. 1 that includes the cloud platform manager 138 that includes the cloud manager installer 104 and the blueprint 136a of FIG. 1. In this example, the first vA 320 communicates with a plurality of example component or host servers 330, 332, 334, 336 that store components for execution by users (e.g., the web server 210a of FIG. 2 with web components, the app server 210b of FIG. 2 with application components, the DB server 210c of FIG. 2 with database components, etc.). For example, the component servers 330, 332, 334, 336 may be deployed by the cloud manager installer 104 based on the blueprint 136a.

In the illustrated example of FIG. 3, the component servers 330, 332, 332, 336 include a first example component server 330, a second example component server 332, a third example component server 334, and a fourth example component server 336. As shown in the example of FIG. 3, the third and fourth component servers 334, 336 can stem from the first component server 330 rather than (or in addition to) directly from the first vA 320, although the first vA 320 can still communicate with the third and fourth servers 334, 336. The LB 310 enables the multiple vAs 320, 322, 324 and multiple servers 330, 332, 334, 336 to appear as one device to a user. Access to functionality can then be distributed among the vAs 320, 322, 324 by the LB 310 and among the component servers 330, 332, 334, 336 by the respective vA which, in this example, is the first vA 320. The LB 310 can use least response time, round-robin, and/or other method to balance traffic to the vAs 320, 322, 324 and the component servers 330, 332, 334, 336, for example.

In the example installation 300 depicted in FIG. 3, each vA 320, 322, 324 includes an example endpoint (e.g., a management endpoint) 340, 342, 344 including a first example endpoint 340, a second example endpoint 342, and a third example endpoint 344. Each component server 330, 332, 334, 336 includes an example agent (e.g., a management agent) 350, 352, 354, 356. The agents 350, 352, 354, 356 can communicate with their respective endpoint 340 to facilitate transfer of data, execution of tasks, etc., for example.

In some examples, the agents 350, 352, 354, 356 synchronize the component servers 330, 332, 334, 336 with the vAs 320, 322, 324 and facilitate host access and associated services (e.g., hostd, ntpd, sfcbd, slpd, wsman, vobd, etc.). The agents 350, 352, 354, 356 can communicate with their respective endpoint 340, 342, 344 to facilitate transfer of data, execution of tasks, etc., for example. The relationship between the management endpoints 340, 342, 344 and the associated agents 350, 352, 354, 356 can be used to deploy and install software on multiple component servers 330, 332, 334, 336. The endpoints 340, 342, 344 can correspond to the endpoints 156 of FIG. 1.

In the illustrated example of FIG. 3, an example user interface (e.g., a graphical user interface) 358 associated with a front end of the installation 300 guides a customer through one or more questions to determine system requirements for the installation 300. In FIG. 3, the user interface 358 is an installation wizard executed by the cloud manager installer 104 to configure and deploy the installation 300. Once the customer has completed the questionnaire and provided firewall access to install the agents 350-356, the agents 350-356 can communicate with the endpoints 340, 342, 344 without customer involvement. Thus, for example, if the blueprint 136a of FIG. 1 used to execute the installation 300 is modified, the endpoints 340, 342, 344 and/or the agents 350-356 can facilitate the modification of the application 116 automatically and/or without intervention from the administrator 112, the developer 114, etc., of FIG. 1.

Figure 4:
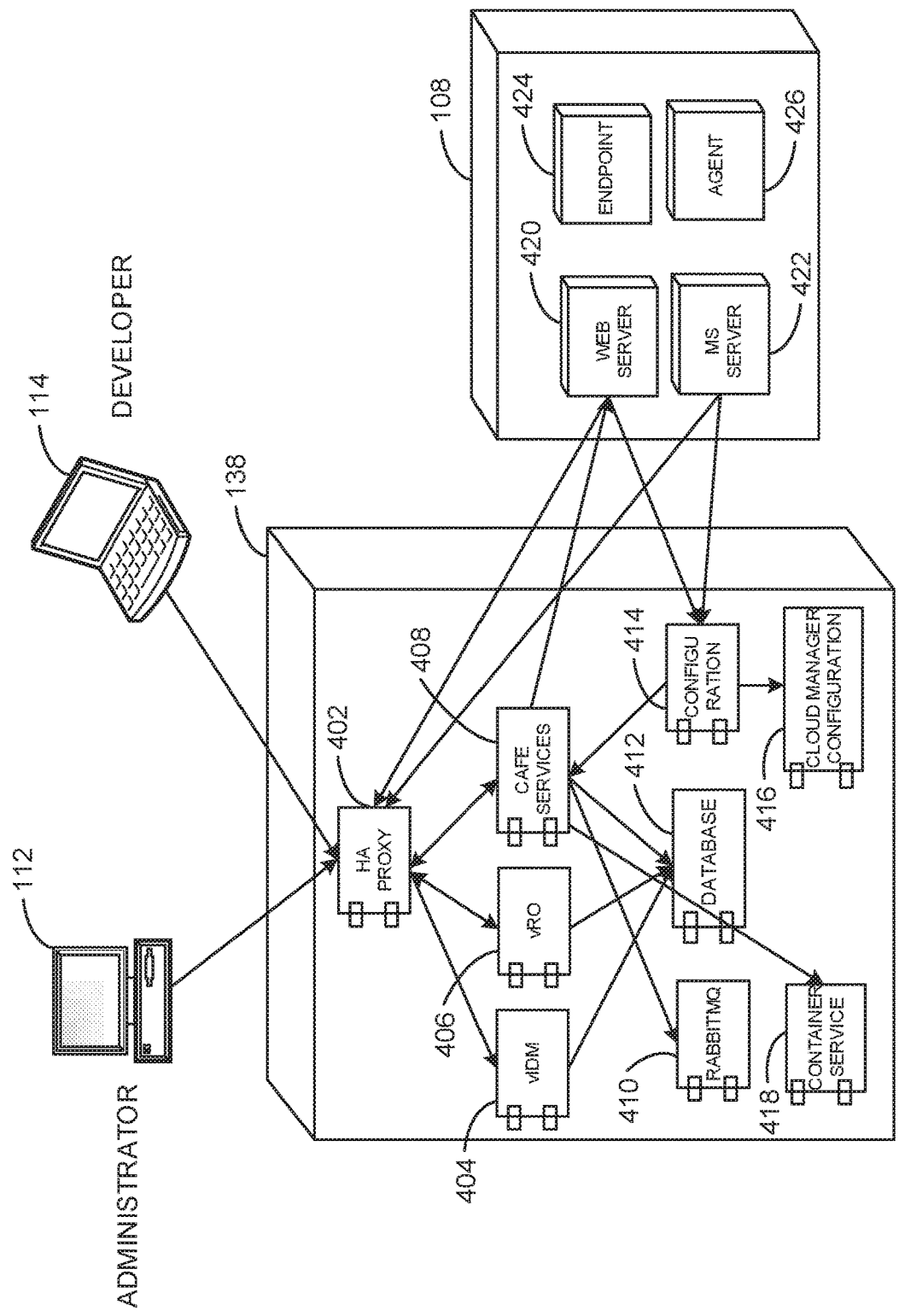
FIG. 4 is a schematic illustration of an example implementation of the cloud platform manager of FIG. 1.

FIG. 4 is a schematic illustration of an example implementation of the cloud platform manager 138 of FIG. 1. In FIG. 4, the cloud platform manager 138 is in communication with the cloud provider 108 of FIG. 1. Alternatively, the cloud platform manager 138 may not be in communication with the cloud provider 108 and, thus, may be optionally included in FIG. 4. In FIG. 4, the administrator 112 and/or the developer 114 of FIG. 1 can execute the cloud platform manager 138 on a computing device. As depicted in FIG. 4, the cloud platform manager 138 is a container-based application including one or more containers including an example high availability (HA) proxy container 402, an example vIDM container 404, an example vRO container 406, an example cafe services container 408, an example Rabbit MQ container 410, an example database container 412, an example configuration container 414, an example cloud manager configuration container 416, and an example container service container 418.

In the illustrated example of FIG. 4, the HA proxy container 402 is a proxy including one or more ports that can receive and/or transmit requests. For example, the HA proxy container 402 may include port 443 to obtain requests from the administrator 112 and/or the developer 114. In FIG. 4, the vIDM container 404 is an identity manager provided by VMware®, Inc., to facilitate access to the cloud provider 108. In FIG. 4, the vRO container 406 is a container includes services associated with vRealize® Orchestrator™ (vRO) provided by VMware®, Inc., to schedule and automate tasks for execution by the cloud provider 108. In FIG. 4, the cafe services container 408 is a container that includes services associated with vRA provided by VMware®, Inc. In FIG. 4, the Rabbit MQ container 410 is a container corresponding to message-broker software to support streaming text oriented messaging protocol, message queuing telemetry transport, and other protocols.

In the illustrated example of FIG. 4, the database container 412 is a relational database management system that can handle workloads ranging from single-machine applications to Web services or data warehousing with many concurrent users. In FIG. 4, the configuration container 414 is a container that includes the configuration capabilities (e.g., configuration parameters, configuration blueprints, configuration settings, etc.) of the cloud platform manager 138. In some examples, the configuration capabilities are cloned and/or otherwise obtained from the cloud manager installer 104. In FIG. 4, the cloud manager configuration container 416 includes data (e.g., information from the database 150, the blueprint 136a, etc.) cloned and/or otherwise obtained from the cloud manager installer 104 to manage the application 116 of FIG. 1. For example, the cloud manager configuration container 416 may be executed by the lifecycle controller 148 of FIG. 1 to manage the application 116. In FIG. 4, the container service container 418 is a container that can be used by the cafe services container 408 to provide the container provisioning features for the container platform manager 102 of FIG. 1.

In the illustrated example of FIG. 4, the cloud provider 108 includes an example web server 420, an example management service (MS) server 422, an example endpoint 424, and an example agent 426. In FIG. 4, the cloud platform manager 138 instructs the cloud provider 108 to provision virtual resources and/or other cloud computing operations via the web server 422. In FIG. 4, the cloud platform manager 138 obtains feedback or other information from the MS server 422. In FIG. 4, the endpoint 424 and the agent 426 are used by the cloud provider 108 to establish the virtual computing environment 106 of FIG. 1 to provision and execute the application 116 of FIG. 1.

FIG. 5 depicts a portion of an example blueprint 500 in human-readable form. In FIG. 5, the blueprint 500 is in human-readable text to enable the administrator 112, the developer 114, etc., of FIG. 1 to generate, edit, and/or otherwise modify the blueprint 500 with a text editor or other program of choice. The blueprint 500 of FIG. 5 includes machine components, software, networking, and properties in YAML format. Alternatively, the blueprint 500 may be in a different format.

Flowcharts representative of example hardware logic, machine readable instructions, hardware implemented state machines, and/or any combination thereof for implementing the example container platform manager 102, the example cloud manager installer 104, and/or the example cloud platform manager 138 of FIG. 1 are shown in FIGS. 6-11. The machine readable instructions may be an executable program or portion of an executable program for execution by a computer processor such as the processor 1212 shown in the example processor platform 1200 discussed below in connection with FIG. 12 and/or the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1212 of FIG. 12 and/or the processor 1312 of FIG. 13, but the entire program and/or parts thereof could alternatively be executed by a device other than the processor 1212 of FIG. 12 and/or the processor 1312 of FIG. 13 and/or embodied in firmware or dedicated hardware. Further, although the example program is described with reference to the flowcharts illustrated in FIGS. 6-11, many other methods of implementing the example container platform manager 102, the example cloud manager installer 104, and/or the example cloud platform manager 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 6:
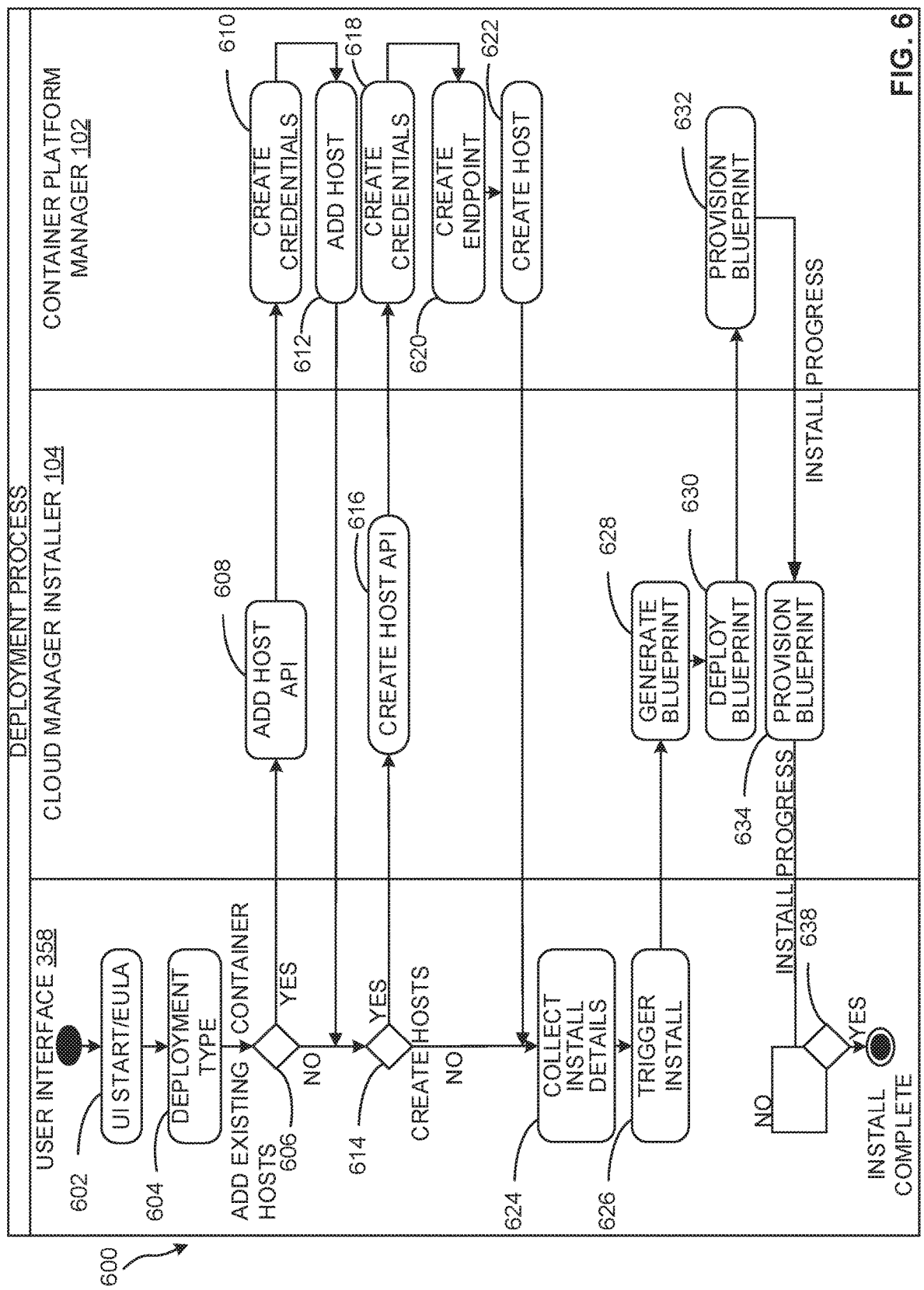
FIG. 6 is a flowchart representative of example machine readable instructions that may be executed to implement the example container platform manager of FIG. 1 and the example cloud manager installer of FIGS. 1, 2, 3, and/or 4 to provision the example cloud computing application of FIGS. 1 and/or 3.

FIG. 6 is a flowchart representative of example machine readable instructions 600 that may be executed to implement the container platform manager 102 of FIG. 1 and the cloud manager installer 104 of FIGS. 1, 2, 3, and/or 4 to provision the virtual computing environment 106 of FIG. 1. The machine readable instructions 600 begin at block 602, at which the user interface 358 of FIG. 3 executed by the cloud manager installer 104 of FIG. 1 starts and displays an end user license agreement (EULA). For example, the cloud manager installer 104 may display an installation wizard to facilitate the machine readable instructions 600 of FIG. 6.

At block 604, the user interface 358 of the cloud manager installer 104 obtains a deployment type. For example, the user interface 358 may obtain a deployment type such as a minimal instance deployment, an enterprise deployment, etc., from the administrator 112, the developer 114, etc.

At block 606, the user interface 358 obtains a decision whether to add existing container hosts. For example, the user interface 358 may obtain container information from the administrator 112, the developer 114, etc., corresponding to adding one or more of the containers 122 of FIG. 1.

If, at block 606, the user interface 358 obtains the decision to add existing container hosts, then, at block 608, the cloud manager installer 104 adds a host API. For example, the infrastructure controller 146 may add and configure one of the containers 122 based on the container information. In such examples, the infrastructure controller 146 can add an API associated with obtaining, configuring, and/or deploying the one of the containers 122 to the second communication interface 140 to invoke. For example, the second communication interface 140 may invoke the API to obtain one or more containers 122 from the container database 132 of FIG. 1. In other examples, the second communication interface 140 may transmit the API to the cloud provider 108 to obtain one or more containers 122 from the container database 132.

At block 610, the container platform manager 102 creates credentials associated with the added host API. For example, the container controller 126 of FIG. 1 may generate credentials to be used by the cloud provider 108, the administrator 112, the developer 114, etc., to deploy and/or control the containers 122. At block 612, the container platform manager 102 adds the host. For example, the container controller 126 may add the one or more containers 122 to an installation to be provisioned to the virtual computing environment 106 of FIG. 1. In response to adding the host at block 612, control returns to block 614 to determine whether to create hosts with the user interface 358.

If, at block 606, the user interface 358 does not obtain the decision to add existing container hosts, then, at block 614, the user interface 358 determines whether to create hosts. For example, the user interface 358 may obtain a decision and/or host information from the administrator 112, the developer 114, etc., to create one or more hosts, such as the VMs 110 of FIG. 1.

If, at block 614, the user interface 358 determines to create hosts, then, at block 616, the cloud manager installer 104 creates a host API. For example, the infrastructure controller 146 may generate and/or configure one of the VMs 110 based on the host information. In such examples, the infrastructure controller 146 can add an API associated with provisioning, configuring, and/or deploying the one of the VMs 110 to the second communication interface 140 to invoke. For example, the second communication interface 140 may invoke the API to instruct the cloud provider 108 to generate the one or more VMs 110 based on specified virtual resources obtained from the administrator 112, the developer 114, etc. In other examples, the second communication interface 140 can transmit the API to the cloud provider 108 to invoke the API to provision the VMs 110.

At block 618, the container platform manager 102 creates credentials associated with the created host API. For example, the container controller 126 of FIG. 1 may generate credentials to be used by the cloud provider 108, the administrator 112, the developer 114, etc., to deploy and/or control the VMs 110. At block 620, the container platform manager 102 creates an endpoint. For example, the container controller 126 may add the one or more endpoints 156 to an installation to be provisioned to the virtual computing environment 106 of FIG. 1. In response to creating the endpoint at block 620, the container platform manager 102 creates the host. For example, the container platform manager 102 can create a first one of the endpoints 156 at block 620 and create a first one of the VMs 110 to include the first one of the endpoints 156 at block 622. In response to creating the host at block 622, control returns to block 624 to collect installation (INSTALL) details.

If, at block 614, the user interface 358 does not determine to create hosts, then, at block 624, the user interface 358 collects installation details. For example, the installation wizard displayed by the user interface 358 may obtain configuration and/or installation information for the VMs 110, the containers 122, and/or, more generally, the virtual computing environment 106. For example, the user interface 358 may obtain details from the administrator 112, the developer 114, etc., corresponding to how to configure, install, and/or otherwise provision the installation 300 of FIG. 3.

At block 626, the user interface 358 triggers the installation. For example, the user interface 358 may obtain a command or instruction to begin the installation of one or more of the deployment environments 120a-c, the VMs 110 in the first deployment environment 120a, the containers 122 in the second deployment environment 120b, etc.

At block 628, the cloud manager installer 104 generates a blueprint. For example, the blueprint controller 144 of FIG. 1 may generate the blueprint 136a of FIG. 1 based on at least one of the hosts added at block 612 and/or block 614, the installation details collected at block 624, etc.

At block 630, the cloud manager installer 104 deploys the blueprint. For example, the blueprint controller 144 may transmit the blueprint 136a to the container platform manager 102 to provision the virtual computing environment 106 based on the blueprint 136a. In other examples, the blueprint controller 144 can execute machine readable instructions corresponding to the blueprint 500 of FIG. 5 to instruct the cloud provider 108 to provision the virtual computing environment 106 with the VMs 110, the containers 122, etc., via the communication abstraction layer 152 of the second communication interface 140.

At block 632, the container platform manager 102 provisions the blueprint. For example, the execution environment 128 of FIG. 1 may invoke the first communication interface 124 to transmit data to the cloud provider 108 to provision the virtual computing environment 106. In such examples, the first communication interface 124 can provide one or more APIs to the cloud provider 108 to obtain one or more of the containers 122 from the container database 132, one or more software packages (e.g., the load balancer 310 of FIG. 3, the vAs 320, 322, 324 of FIG. 3, the component servers 330, 332, 334, 336 of FIG. 3, etc.) from the software database 154.

At block 634, the container platform manager 102 provides an installation progress to the cloud manager installer 104. At block 636, the user interface 358 presents the installation progress to a user (e.g., the administrator 112, the developer 114, etc.). At block 638, the user interface 358 determines whether the installation is complete. For example, the user interface 358 may determine that the installation 300 of FIG. 3 corresponding to the virtual computing environment 106 of FIG. 1 is complete based on a completed installation status obtained from the cloud manager installer 104 via the container platform manager 102. In response to the user interface 358 determining that the installation is complete, the machine readable instructions 600 of FIG. 6 conclude.

Figure 7:
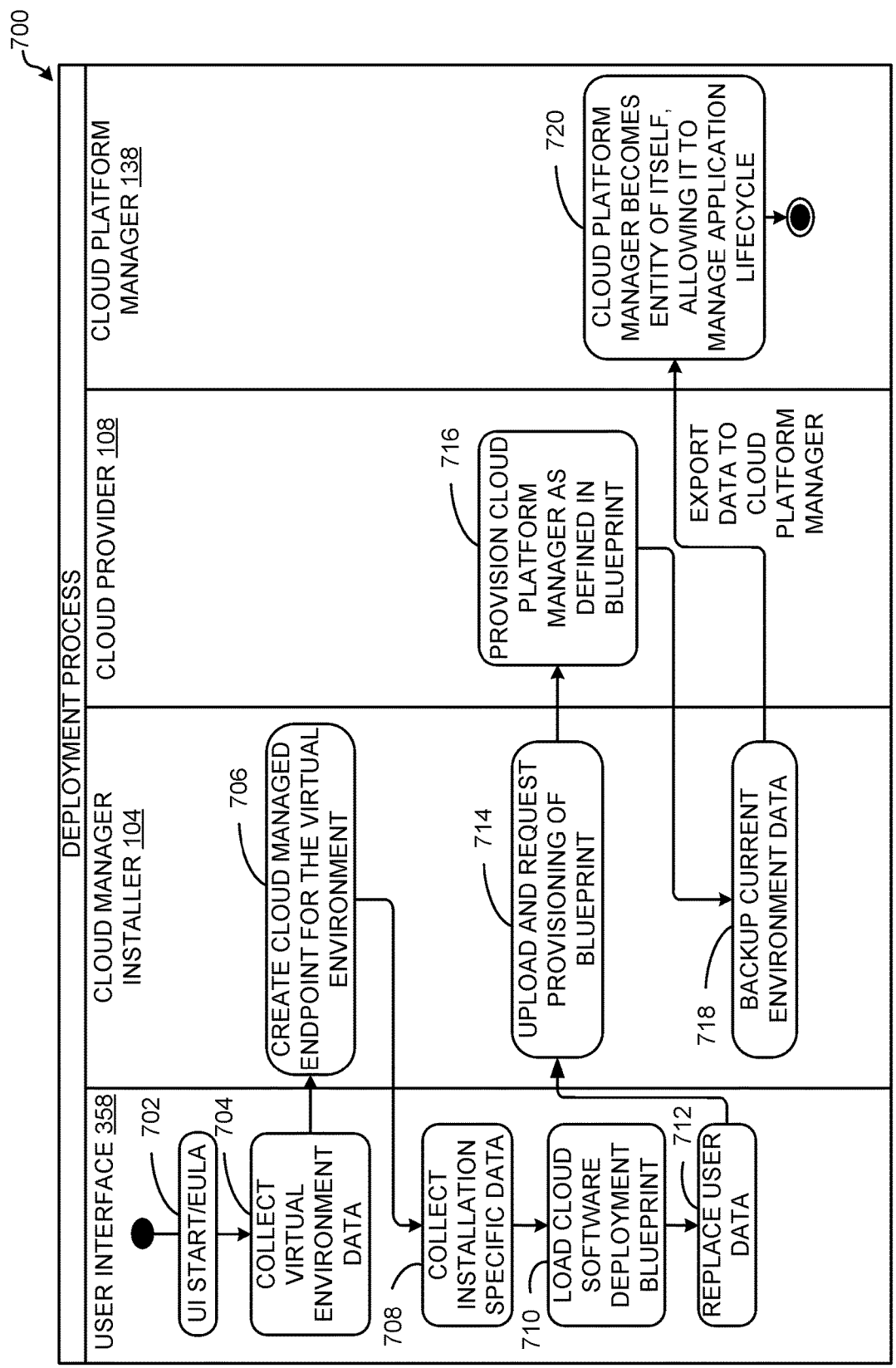
FIG. 7 is flowchart representative of example machine readable instructions that may be executed to implement the example container platform manager of FIG. 1 and the example cloud manager installer of FIGS. 1, 2, 3, and/or 4 to provision the example cloud computing application of FIGS. 1 and/or 3.

FIG. 7 is flowchart representative of example machine readable instructions 700 that may be executed to implement the container platform manager 102 and the cloud manager installer 104 of FIG. 1 to provision the virtual computing environment 106 of FIG. 1. For example, the machine readable instructions 700 of FIG. 7 can provision the virtual computing environment 106 as an entity of the cloud platform manager 138 and, thus, allowing the cloud platform manager 138 to control, monitor, and/or otherwise manage components (e.g., the virtual computing environment 106) of the cloud platform manager 138. The machine readable instructions 700 of FIG. 7 begin at block 702, at which the user interface 358 of FIG. 3 of the cloud manager installer 104 of FIG. 1 starts and displays a EULA. For example, the cloud manager installer 104 may display an installation wizard to facilitate the machine readable instructions 700 of FIG. 7.

At block 704, the user interface 358 collects installation infrastructure data. For example, the user interface 358 may obtain virtual environment data from the administrator 112, the developer 114, etc. In such examples, the virtual environment data can include information corresponding to where to deploy the virtual computing environment 106, such as the cloud provider 108 of FIG. 1. For example, the virtual environment data may include an account (e.g., a user name, a password, and/or other credentials) of the administrator 112, the developer 114, etc., with the cloud provider 108.

At block 706, the cloud manager installer 104 creates a cloud managed endpoint for the virtual environment. For example, the infrastructure controller 146 may generate and/or configure one or more of the endpoints 156 of FIG. 1. In such examples, the infrastructure controller 146 may generate and/or configure the endpoints 156 and instruct the cloud provider 108 to deploy the endpoints 156 to the VMs 110.

At block 708, the user interface 358 collects installation specific data. For example, the user interface 358 may obtain customer data (e.g., data from the administrator 112, the developer 114, etc.) including certificates (e.g., security certificates), usernames and/or passwords, a size (e.g., a quantity of virtual resources including compute, storage, network, security, etc., resources) of the virtual computing environment 106 to be deployed, a quantity of instances of the virtual resources (e.g., 5 GHz of compute resources, 10 GB RAM of storage resources, 3 terabytes (TB) of HDD storage resources, etc.), etc.

At block 710, the user interface 358 loads a cloud software deployment blueprint. For example, the user interface 358 may obtain the blueprint 136 from the blueprint database 134 of FIG. 1. In such examples, the blueprint 136 may be stored locally as the blueprint 136a. In such examples, the user interface 358 can obtain modifications to an obtained one of the blueprints 136a and store a modified one of the blueprints 136a in the database 150 of FIG. 1.

At block 712, the user interface 358 replaces user data. For example, the user interface 358 may display suggestions and/or defaults to a user to modify and/or otherwise complete a generation of the blueprint 136a. In such examples, the developer 114 of FIG. 1 may not have specified an IP port for one of the component servers 330, 332, 334, 336 to communicate with the Internet. Accordingly, the user interface 358 may provide a suggestion to specify a default IP port, such as port 80, in the blueprint 136a to complete the blueprint 136a.

At block 714, the cloud manager installer 104 uploads and requests provisioning of the blueprint. For example, the blueprint controller 144 of FIG. 1 may store the blueprint 136a in the database 150. In such examples, the second communication interface 140 can obtain the blueprint 136a from the database 150 and package the blueprint 136a into one or more files (e.g., a YAML file, a compressed file format (e.g., .zip, .zipx, etc.)), etc.), messages (e.g., HTTP packets), etc., to be transmitted to the cloud provider 108 of FIG. 1. Accordingly, the cloud manager installer 104 may transmit the blueprint 136a to the cloud provider 108 to establish the virtual computing environment 106, execute one or more instructions of the blueprint 136a to instruct the cloud provider 108 to provision the VMs 110, the containers 122, etc., to the virtual computing environment, etc., and/or a combination thereof.

At block 716, the cloud provider 108 provisions an instance of the cloud platform manager 138 as defined in the blueprint 136a. For example, based on the blueprint 136a, the cloud provider 108 may establish the virtual computing environment 106, provision the VMs 110 in the first deployment environment 120a, provision the containers 122 in the second deployment environment 120b, retrieve software from the software database 154 to configure the VMs 110 and/or virtual resources associated with the VMs 110, etc. For example, the cloud provider 108 may obtain instructions from the cloud manager installer 104 to provision the cloud platform manager 138 to one or more of the VMs 110 as defined in the blueprint 136a to manage a lifecycle of the application 116.

At block 718, the cloud manager installer 104 backups current environment data. For example, the cloud manager installer 104 may make a copy of the database 150 including the blueprint 136a. At block 720, the cloud manager installer 104 exports the data to the cloud platform manager 138. For example, the second communication interface 140 may transmit data including an instance of the database 150, the blueprint 136a, and/or any other configuration data, parameter information, etc., associated with installing the cloud platform manager 138.

At block 720, the cloud platform manager 138 becomes an entity of itself and, thus, allowing it to manage an application lifecycle. For example, the cloud platform manager 138 includes the blueprint 136a used to deploy the cloud platform manager 138. In such examples, the cloud platform manager 138 can consider itself as an application that the cloud platform manager 138 has provisioned and, thus, can control, monitor, and/or otherwise manage. By including the cloud manager installer 104 in the cloud platform manager 138, the cloud platform manager 138 can execute the lifecycle controller 148 of the cloud manager installer 104 to manage a lifecycle of the application and/or, in some examples, modify one or more components (e.g., virtual resources, the VMs 110, the containers 122, etc.) of the application 116. In response to the cloud platform manager 138 becoming an entity of itself, the machine readable instructions 700 of FIG. 7 conclude.

Advantageously, because the lifecycle controller 148 can interpret the blueprint 136a based on being a part of the cloud manager installer 104 that provisioned the blueprint 136a, a modification to the blueprint 136a can facilitate a modification to a corresponding component of the application 116. For example, in response to obtaining a modification to the blueprint, the lifecycle controller 148 may identify a virtual resource affected by the modification and invoke the endpoint 156 to redeploy the virtual resource having the modification. Advantageously, by modifying the application 116 based on modifying the blueprint 136a, a different one of the cloud manager installer 104 does not have to be configured, built, and deployed by a team of developers compared to prior techniques.

Figure 8:
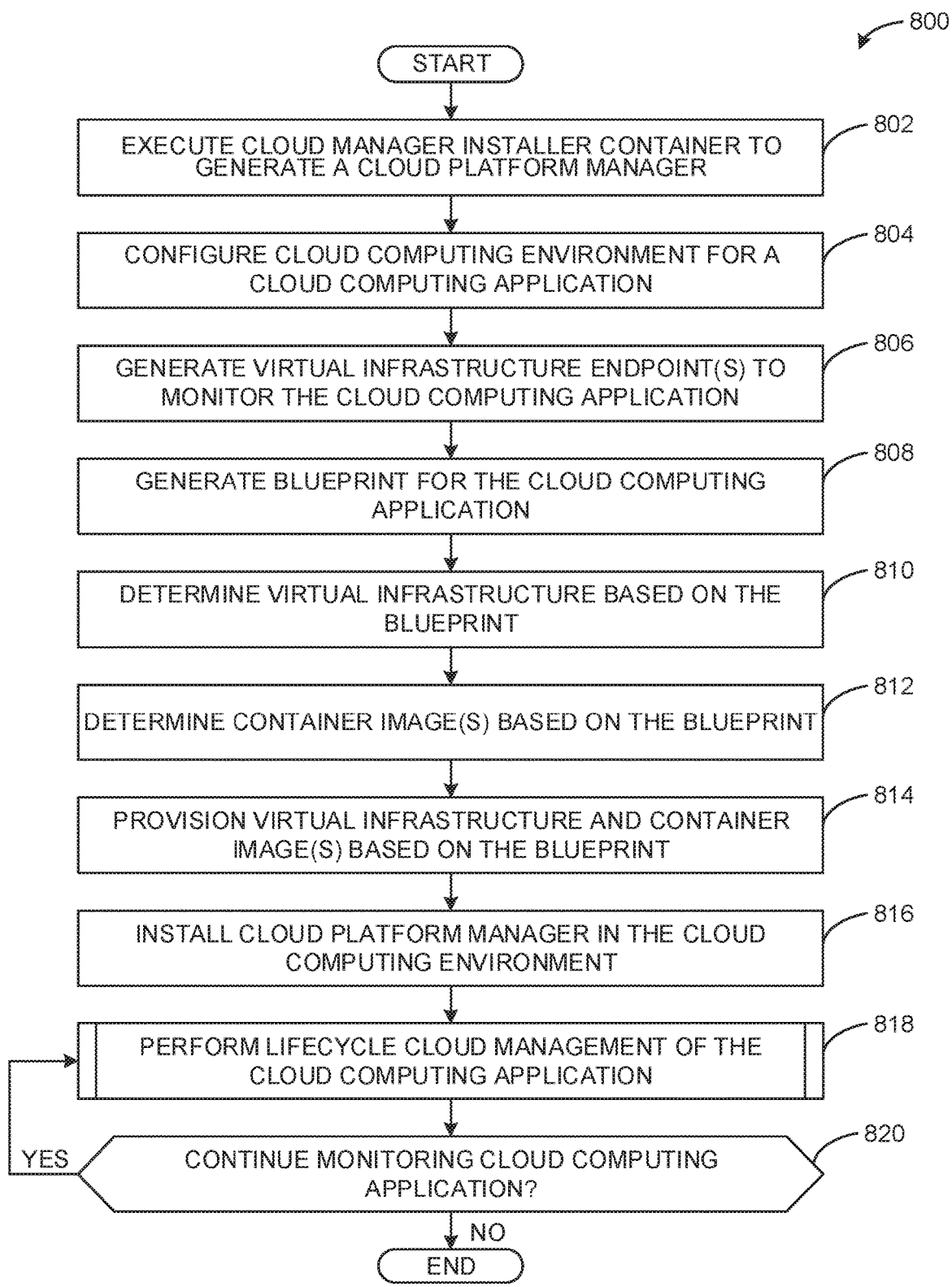
FIG. 8 is a flowchart representative of example machine readable instructions that may be executed to implement the example container platform manager of FIG. 1 and the example cloud manager installer of FIGS. 1, 2, 3, and/or 4 to provision and manage the example cloud computing application of FIGS. 1 and/or 3.

FIG. 8 is a flowchart representative of example machine readable instructions 800 that may be executed to implement the container platform manager 102 and the cloud manager installer 104 of FIG. 1 to provision and manage the virtual computing environment 106 of FIG. 1. The machine readable instructions 800 of FIG. 8 begin at block 802, at which the container platform manager 102 executes a cloud manager installer container to generate a cloud platform manager. For example, the first communication interface 124 of FIG. 1 may obtain the cloud manager installer 104 from the container database 132. In such examples, the container controller 126 of FIG. 1 can execute the cloud manager installer 104 to generate the cloud platform manager 138 of FIG. 1.

At block 804, the cloud manager installer 104 configures a cloud computing environment for a cloud computing application. For example, the user interface 358 of FIG. 3 and/or the environment controller 142 of FIG. 1 may obtain virtual environment information from the administrator 112, the developer 114, etc., to execute the application 116 of FIG. 1. In such examples, the virtual environment information can include cloud provider information including an identification of the cloud provider 108, a user account (e.g., login credentials, user account credentials, etc.) of the cloud provider 108, etc.

At block 806, the cloud manager installer 104 generates virtual infrastructure endpoint(s) to monitor the cloud computing application. For example, the environment controller 142 may generate one or more of the endpoints 156 of FIG. 1 based on the virtual environment information.

At block 808, the cloud manager installer 104 generates a blueprint for the cloud computing application. For example, the blueprint controller 144 of FIG. 1 may obtain one of the blueprints 136 from the blueprint database 134 of FIG. 1. In such examples, the blueprint controller 144 can store an instance of the blueprint 136a in the database 150. The blueprint controller 144 can modify the blueprint 136a to include computer-executable scripts and/or services to be executed, APIs to be called or invoked, virtual resources (e.g., compute, storage, network, security, etc., virtual resources, the load balancer 310 of FIG. 3, etc.) to be provisioned, software and/or firmware to be obtained from the software database 154, etc. In some examples, the blueprint controller 144 stores the blueprint 136a in the database 150, where the blueprint 136a may be obtained from the blueprint database 134 and/or modified after obtaining from the blueprint database 134.

At block 810, the cloud manager installer 104 determines virtual infrastructure based on the blueprint. For example, the infrastructure controller 146 of FIG. 1 may determine a quantity, a type, and/or version of one or more virtual resources including at least one of compute resources, storage resources, network resources, security resources, etc., based on the blueprint 136a.

At block 812, the cloud manager installer 104 determines container image(s) based on the blueprint. For example, the infrastructure controller 146 may identify one or more of the containers 122 of FIG. 1 to configure and/or deploy to the virtual computing environment 106. In such examples, the infrastructure controller 146 can identify one or more APIs that, when invoked, can retrieve and/or configure the containers 122 from the container database 132 of FIG. 1.

At block 814, the cloud manager installer 104 provisions virtual infrastructure and container image(s) based on the blueprint. For example, the second communication interface 140 may invoke the cloud provider 108 to provision the VMs 110 the containers 122, etc., via the communication abstraction layer 152 based on the blueprint 136a.

At block 816, the cloud manager installer 104 installs the cloud platform manager in the cloud computing environment. For example, the second communication interface 140 may transmit data including a copy of the database 150, the blueprint 136a included in the database 150, etc., to the VM 110. In such examples, the second communication interface 140 can transmit the data to the cloud provider 108 to provision to one or more VMs 110 of interest or, in other examples, the second communication interface 140 can transmit the data to the one or more VMs 110 of interest.

At block 818, the cloud manager installer 104 performs lifecycle cloud management of the cloud computing application. For example, the cloud platform manager 138 may execute the cloud manager installer 104 included in the cloud platform manager 138 to oversee and/or otherwise manage a lifecycle of the application 116. In such examples, the cloud platform manager 138 can invoke the lifecycle controller 148 of FIG. 1 to determine whether the blueprint 136a has been modified, a different one of the blueprints 136a has been obtained, etc. In other examples, the lifecycle controller 148 can determine whether to decommission the application 116 after one or more computing workloads has been completed. Example processes that may be used to implement block 818 is described below in connection with FIGS. 9-10.

At block 820, the cloud manager installer 104 determines whether to continue monitoring the cloud computing application. For example, the lifecycle controller 148 and/or, more generally, the cloud platform manager 138 may determine to continue monitoring the application 116 while the application 116 is executing one or more computing workloads. If, at block 820, the cloud manager installer 104 executing on the VM 110 determines to continue monitoring the cloud computing application, control returns to block 818 to perform lifecycle cloud management of the cloud computing platform, otherwise the machine readable instructions 800 of FIG. 8 conclude.

Figure 9:
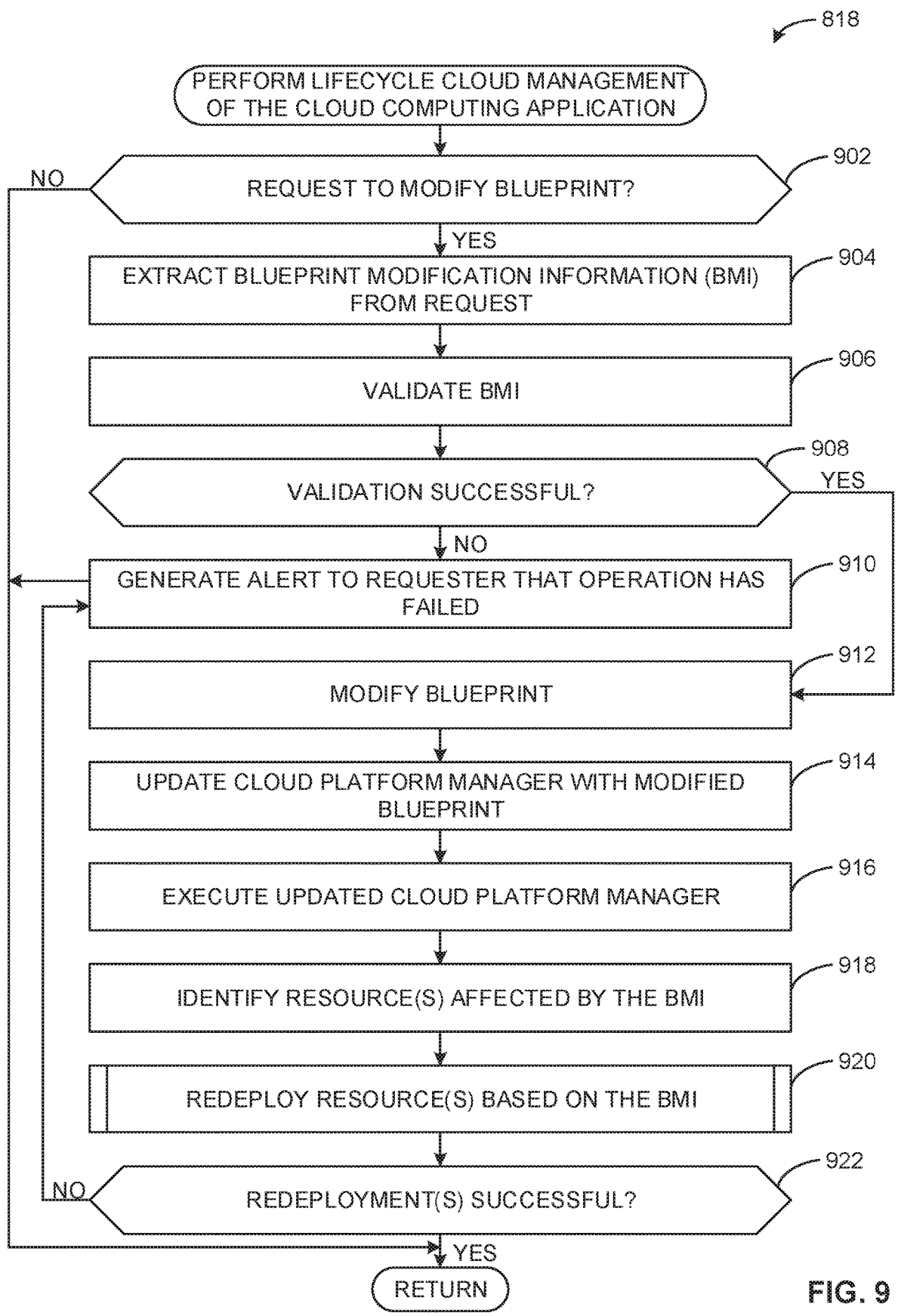
FIGS. 9 and 10 are flowcharts representative of example machine readable instructions that may be executed to implement the example cloud platform manager of FIG. 1 to perform lifecycle cloud management of the example cloud computing application of FIGS. 1 and/or 3.

FIG. 9 is a flowchart representative of an example implementation of block 818 corresponding to machine readable instructions that may be executed to implement the cloud platform manager 138 of FIG. 1 to perform lifecycle cloud management of the cloud computing application. The example implementation of block 818 begins at block 902, at which the cloud platform manager 138 determines whether a request to modify a blueprint has been obtained. For example, the lifecycle controller 148 of FIG. 1 may determine that the administrator 112, the developer 114, etc., of FIG. 1 has requested to modify the blueprint 136a associated with and/or otherwise used to deploy the cloud platform manager 138.

If, at block 904, the cloud platform manager 138 determines that a request to modify the blueprint has not been obtained, the example implementation of block 818 as illustrated in FIG. 9 returns to block 820 of the machine readable instructions 800 of FIG. 8 to determine whether to continue monitoring the cloud computing application. If, at block 904, the cloud platform manager 138 determines that a request to modify the blueprint has been obtained, then, at block 906, the cloud platform manager 138 extracts blueprint modification information (BMI) from the request. For example, the lifecycle controller 148 may extract one or more modifications including a first modification to a virtual resource to be applied to the blueprint 136a from the request.

At block 906, the cloud platform manager 138 validates the BMI. For example, the lifecycle controller 148 may compare the first modification to the virtual resource to a definition, a policy, etc., of the virtual resource stored in the blueprint database 134 of FIG. 1. In such examples, the lifecycle controller 148 can determine that the first modification is valid based on the comparison.

At block 908, the cloud platform manager 138 determines whether the validation is successful. For example, the lifecycle controller 148 may determine that the first modification violates and/or is otherwise not compatible with the definition, the policy, etc., of the virtual resource as specified in the blueprint database 134. In other examples, the lifecycle controller 148 can determine that the first modification can result in the virtual resource having a valid definition, policy, etc., after applying the first modification based on the comparison.

If, at block 908, the cloud platform manager 138 determines that the validation is not successful, then, at block 910, the cloud platform manager 138 generates an alert to a requester that an operation has failed. For example, the lifecycle controller 148 may generate an alert to the administrator 112, the developer 114, a computing device, etc., that requested to modify the blueprint 136a indicative that the modification is not valid. In such examples, the alert can identify a suggestion, a recommendation, etc., to modify the request to facilitate a valid modification. In response to generating the alert at block 910, the example implementation of block 818 as illustrated in FIG. 9 returns to block 820 of the machine readable instructions 800 of FIG. 8 to determine whether to continue monitoring the cloud computing application.

If, at block 908, the cloud platform manager 138 determines that the validation is successful, control proceeds to block 912 to modify the blueprint. For example, the lifecycle controller 148 may modify the blueprint 136a stored by the cloud platform manager 138.

At block 914, the cloud platform manager 138 updates the cloud platform manager 138 with the modified blueprint. For example, the lifecycle controller 148 may relaunch and/or otherwise redeploy the cloud platform manager 138 having the modified blueprint 136a, based on the modified blueprint 136a, etc. Advantageously, in such examples, the cloud manager installer 104 can be reused with a modified blueprint instead of regenerating and/or otherwise rebuilding the cloud manager installer 104.

At block 916, the cloud platform manager 138 executes the updated cloud platform manager 138. For example, the cloud platform manager 138 may be executed having the updated blueprint 136a based on the first modification. In such examples, the cloud platform manager 138 can manage the application 116 based on the updated blueprint 136a.

At block 918, the cloud platform manager 138 identifies resource(s) affected by the BMI. For example, the lifecycle controller 148 may determine that the first modification is an upgrade to software and/or firmware associated with the load balancer 310 of FIG. 3. In such examples, the lifecycle controller 148 can identify that the load balancer 310 is affected by the first modification.

At block 920, the cloud platform manager 138 redeploys the resource(s) based on the BMI. For example, the lifecycle controller 148 may invoke the endpoint 340 of FIG. 3 to shutdown, upgrade, and restart the load balancer 310. An example process that may be used to implement block 920 is described below in connection with FIG. 11.

At block 922, the cloud platform manager 138 determines whether the redeployment(s) are successful. For example, the lifecycle controller 148 may determine that the load balancer 310 has been successfully updated. In other examples, the lifecycle controller 148 can determine that the load balancer 310 has not been successfully updated by transmitting a ping message to the load balancer 310 and not receiving an acknowledgment or reply message from the load balancer 310, a time out has occurred prior to receiving the acknowledgment or reply message, etc.

If, at block 922, the cloud platform manager 138 determines that the redeployment(s) are not successful, control returns to block 910 to generate an alert to the requester that the operation has failed. If, at block 922, the cloud platform manager 138 determines that the redeployment(s) are successful, the example implementation of block 818 as illustrated in FIG. 9 returns to block 820 of the machine readable instructions 800 of FIG. 8 to determine whether to continue monitoring the cloud computing application.

Figure 10:
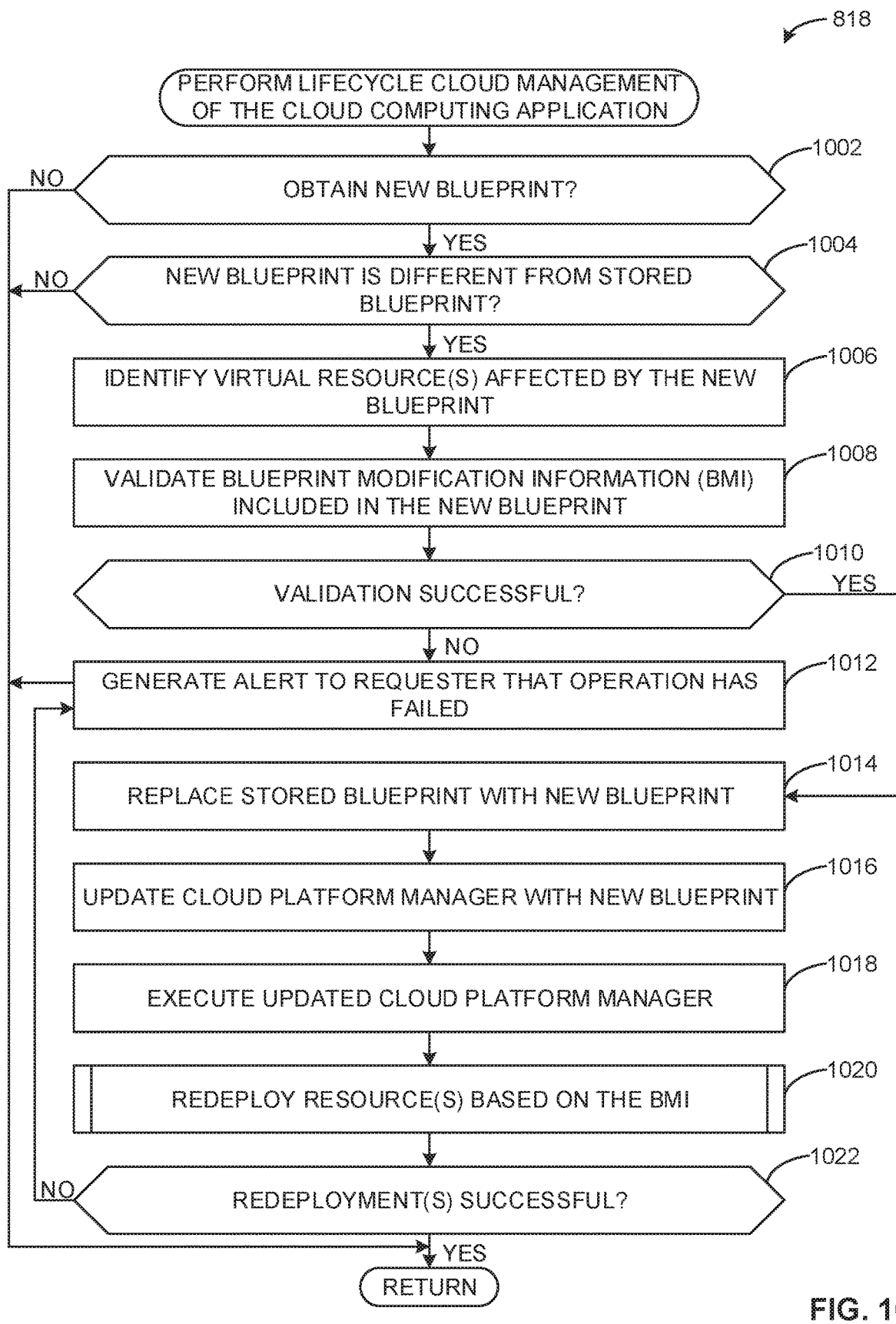

FIG. 10 is a flowchart representative of an example implementation of block 818 corresponding to machine readable instructions that may be executed to implement the cloud platform manager 138 of FIG. 1 to perform lifecycle cloud management of the cloud computing application. The example implementation of block 818 illustrated in FIG. 10 begins at block 1002, at which the cloud platform manager 138 determines whether a new blueprint has been obtained. In an example where the blueprint 136a stored by the cloud platform manager 138 is a first blueprint (e.g., a stored blueprint), the lifecycle controller 148 of FIG. 1 may determine that a second blueprint has been obtained from the administrator 112, the developer 114, a computing device, etc.

If, at block 1002, the cloud platform manager 138 determines that a new blueprint has not been obtained, the example implementation of block 818 as illustrated in FIG. 10 returns to block 820 of the machine readable instructions 800 of FIG. 8 to determine whether to continue monitoring the cloud computing application.

If, at block 1002, the cloud platform manager 138 determines that a new blueprint has been obtained, then, at block 1004, the cloud platform manager 138 determines whether the new blueprint is different from the stored blueprint. For example, the lifecycle controller 148 may compare the first blueprint and the second blueprint and identify one or more differences or modifications based on the comparison. If, at block 1004, the cloud platform manager 138 determines that the new blueprint is not different from the stored blueprint, the example implementation of block 818 as illustrated in FIG. 10 returns to block 820 of the machine readable instructions 800 of FIG. 8 to determine whether to continue monitoring the cloud computing application.

If, at block 1004, the cloud platform manager 138 determines that the new blueprint is different from the stored blueprint, then, at block 1006, the cloud platform manager 138 identifies virtual resource(s) affected by the new blueprint. For example, the lifecycle controller 148 may determine that the new blueprint includes a first modification to one of the VMs 110, one of the containers 122, etc. In such examples, the lifecycle controller 148 can identify the one of the VMs, the one of the containers, etc., as being affected by a first modification corresponding to BMI included in the second blueprint.

At block 1008, the cloud platform manager 138 validates blueprint modification information (BMI) included in the new blueprint. For example, the lifecycle controller 148 may determine that the new blueprint includes a first modification to the virtual resource to a definition, a policy, etc., of the virtual resource stored in the blueprint database 134 of FIG. 1. In such examples, the lifecycle controller 148 can determine that the first modification is valid based on the comparison.

At block 1010, the cloud platform manager 138 determines whether the validation is successful. For example, the lifecycle controller 148 may determine that the first modification violates and/or is otherwise not compatible with the definition, the policy, etc., of the virtual resource as specified in the blueprint database 134. In other examples, the lifecycle controller 148 can determine that the first modification can result in the virtual resource having a valid definition, policy, etc., after applying the first modification based on the comparison.

If, at block 1010, the cloud platform manager 138 determines that the validation is not successful, then, at block 1012, the cloud platform manager 138 generates an alert to a requester that an operation has failed. For example, the lifecycle controller 148 may generate an alert to the administrator 112, the developer 114, a computing device associated with the administrator 112 or the developer 114, etc., that requested to modify the blueprint 136a, where the alert is indicative that the modification is not valid. In such examples, the alert can identify a suggestion, a recommendation, etc., to modify the request to facilitate a valid modification. In response to generating the alert at block 1012, the example implementation of block 818 as illustrated in FIG. 10 returns to block 820 of the machine readable instructions 800 of FIG. 8 to determine whether to continue monitoring the cloud computing application.

If, at block 1010, the cloud platform manager 138 determines that the validation is successful, control proceeds to block 1014 to replace the stored blueprint with the new blueprint. For example, the lifecycle controller 148 may replace the blueprint 136a stored by the cloud platform manager 138 with the new blueprint.

At block 1016, the cloud platform manager 138 updates the cloud platform manager 138 with the new blueprint. For example, the lifecycle controller 148 may relaunch and/or otherwise redeploy the cloud platform manager 138 having the second blueprint, based on the second blueprint, etc. Advantageously, in such examples, the cloud manager installer 104 can be reused with the second blueprint instead of regenerating and/or otherwise rebuilding the cloud manager installer 104 based on the second blueprint.

At block 1018, the cloud platform manager 138 executes the updated cloud platform manager 138. For example, the cloud platform manager 138 may be executed having the second blueprint. In such examples, the cloud platform manager 138 can manage the application 116 based on the second blueprint.

At block 1020, the cloud platform manager 138 redeploys the resource(s) based on the BMI. For example, the lifecycle controller 148 may invoke the endpoint 340 of FIG. 3 to shutdown, upgrade, and restart one or more of the VMs 110, one or more of the containers 122, etc. An example process that may be used to implement block 1020 is described below in connection with FIG. 11.

At block 1022, the cloud platform manager 138 determines whether the redeployment(s) are successful. For example, the lifecycle controller 148 may determine that one or more of the VMs 110 have been successfully updated. In other examples, the lifecycle controller 148 can determine that one or more of the VMs 110 have not been successfully updated by transmitting a ping message to the one or more VMs 110 and not receiving an acknowledgment or reply message from the one or more VMs 110, a time out has occurred prior to receiving the acknowledgment or reply message, etc.

If, at block 1022, the cloud platform manager 138 determines that the redeployment(s) are not successful, control returns to block 1012 to generate an alert to the requester that the operation has failed. If, at block 1022, the cloud platform manager 138 determines that the redeployment(s) are successful, the example implementation of block 818 as illustrated in FIG. 10 returns to block 820 of the machine readable instructions 800 of FIG. 8 to determine whether to continue monitoring the cloud computing application.

Figure 11:
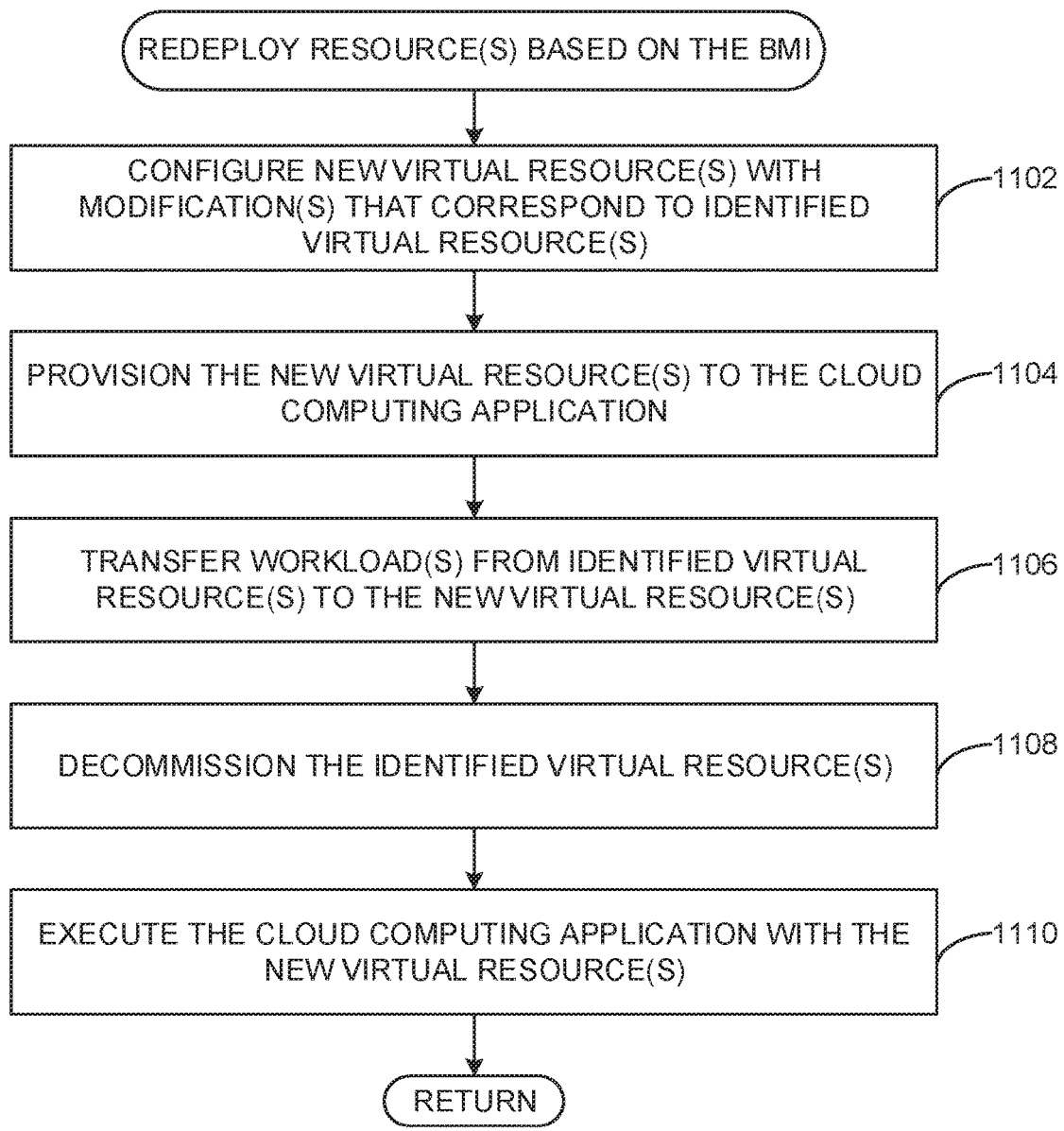
FIG. 11 is a flowchart representative of example machine readable instructions that may be executed to implement the example cloud platform manager of FIG. 1 to redeploy virtual resource(s) based on modifications of an example blueprint.
Figure 12:
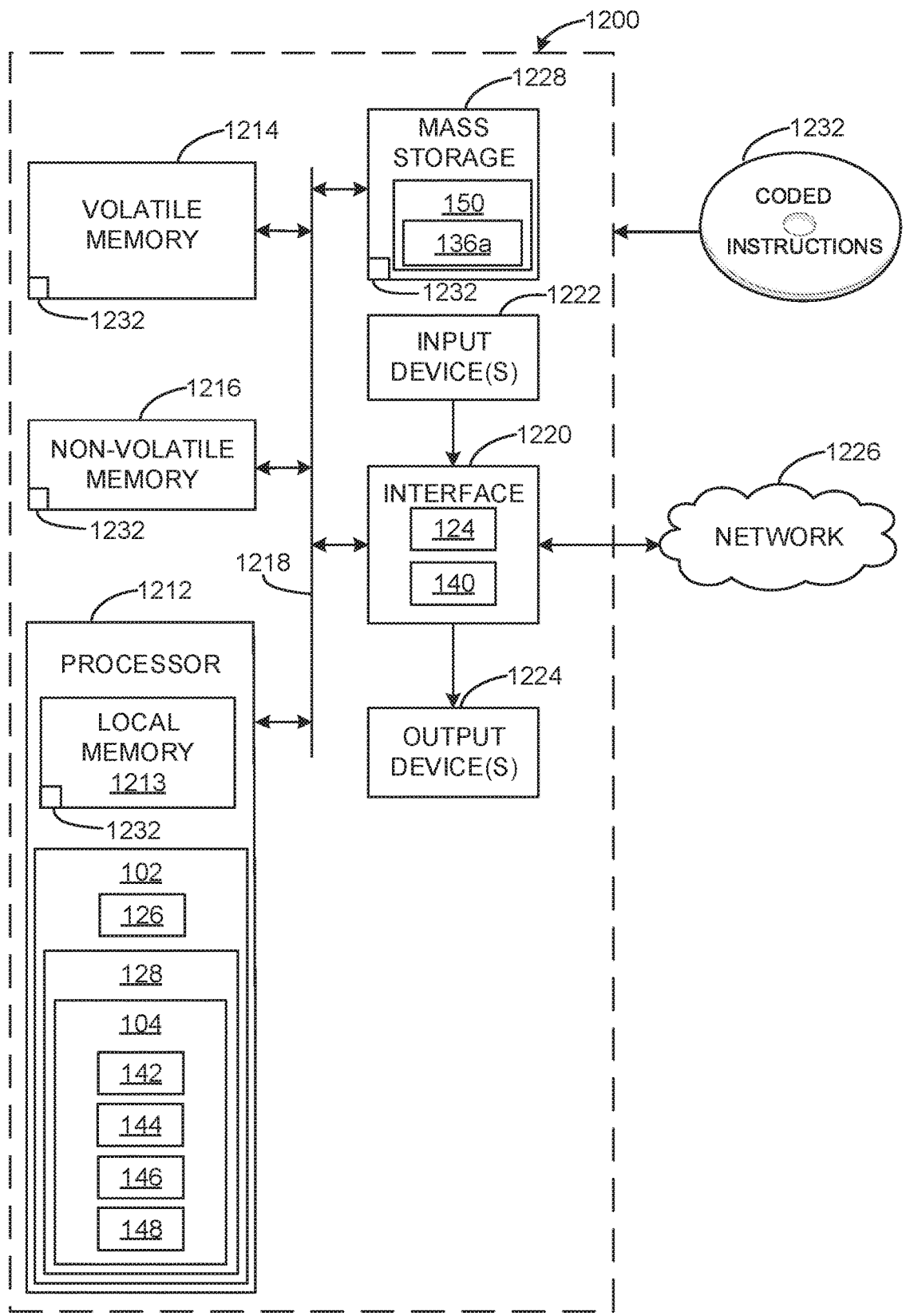
FIG. 12 is a block diagram of an example processing platform structured to execute the instructions of FIGS. 6-8 to implement the example container platform manager of FIG. 1 and the example cloud manager installer of FIGS. 1, 2, 3, and/or 4.

FIG. 11 is a flowchart representative of an example implementation of block 920 and/or block 1020 corresponding to machine readable instructions that may be executed to implement the cloud platform manager 138 of FIG. 1 to redeploy resource(s) based on BMI. The example implementation of block 920 and/or block 1020 as illustrated in FIG. 12 begins at block 1202, at which the cloud platform manager 138 configures new virtual resource(s) with modification(s) that correspond to identified virtual resource(s). For example, the lifecycle controller 148 of FIG. 1 may identify the load balancer 310 of FIG. 3 as being affected by a first modification associated with a new blueprint, a modification to a stored blueprint, etc., associated with the cloud platform manager 138. In such examples, the lifecycle controller 148 can invoke the cloud provider 108 to configure another instance of the load balancer 310 with the first modification.

At block 1104, the cloud platform manager 138 provisions the new virtual resource(s) to the cloud computing application. For example, the lifecycle controller 148 may invoke the cloud provider 108 to provision the modified load balancer 310 to the application 116 of FIG. 1.

At block 1106, the cloud platform manager 138 transfers workload(s) from the identified virtual resource(s) to the new virtual resource(s). For example, the lifecycle controller 148 may invoke the VMs 110 to transfer one or more computing workloads from the previously provisioned load balancer 310 to the modified load balancer 310.

At block 1108, the cloud platform manager 138 decommissions the identified virtual resource(s). For example, the lifecycle controller 148 may invoke the cloud provider 108 to return the previously provisioned load balancer 310 to a pool of virtual resources. In other examples, the lifecycle controller 148 can instruct the cloud provider 108 to uninstall and/or otherwise remove the previously provisioned load balancer 310 from the application 116.

At block 1110, the cloud platform manager 138 executes the cloud computing application with the new virtual resource(s). For example, the lifecycle controller 148 may invoke the VMs 110 to execute the application 116 using the modified load balancer 310. In some examples, in response to executing the cloud computing application with the new virtual resource(s) at block 1110, the example implementation of block 920 as illustrated in FIG. 11 returns to block 922 of the example of FIG. 9 to determine whether the redeployment(s) are successful. In some examples, in response to executing the cloud computing application with the new virtual resource(s) at block 1110, the example implementation of block 1020 as illustrated in FIG. 11 returns to block 1022 of the example of FIG. 10 to determine whether the redeployment(s) are successful.

FIG. 12 is a block diagram of an example processor platform 1200 structured to execute the instructions of FIGS. 6-8 to implement the container platform manager 102 and the cloud manager installer 104 of FIG. 1. The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the container platform manager 102, the container controller 126, the execution environment 128, the cloud manager installer 104, the environment controller 142, the blueprint controller 144, the infrastructure controller 146, and the lifecycle controller 148.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface. In this example, the interface circuit 1220 includes the first communication interface 124 and the second communication interface 140.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives. In this example, the one or more mass storage devices 1228 include and/or otherwise implement the database 150 of FIG. 1, which includes the blueprint 136a of FIG. 1. Additionally or alternatively, the database 150 and/or the blueprint 136a of FIG. 1 may be included in and/or otherwise be implemented by the processor 1212.

The machine executable instructions 1232 of FIGS. 6-8 may be stored in the mass storage device 1228, in the volatile memory 1214, in the non-volatile memory 1216, and/or on a removable non-transitory computer readable storage medium such as a CD or DVD.

Figure 13:
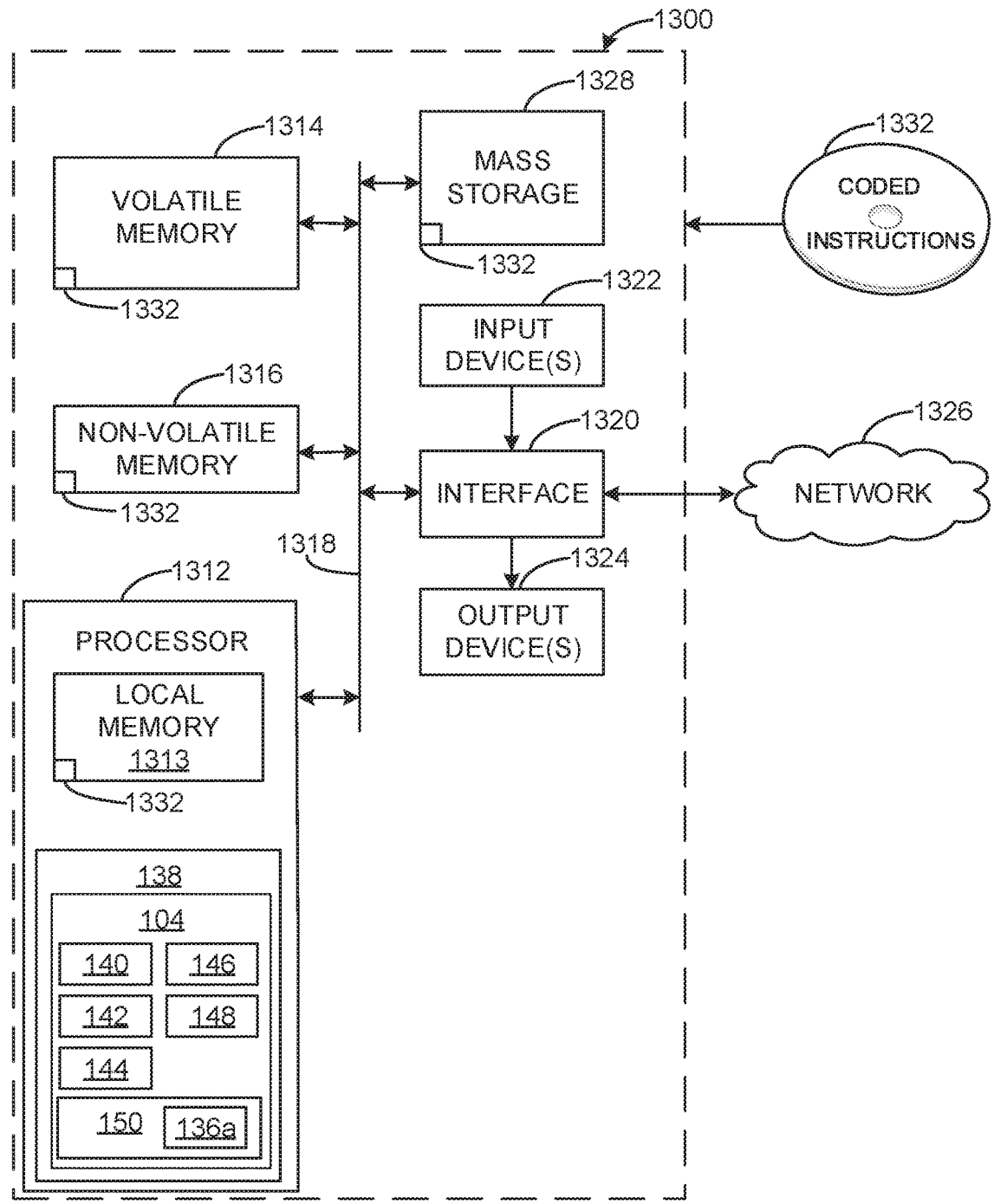
FIG. 13 is a block diagram of an example processing platform structured to execute the instructions of FIGS. 9-11 to implement the example cloud platform manager of FIG. 1 and the example cloud manager installer of FIGS. 1, 2, 3, and/or 4.

FIG. 13 is a block diagram of an example processor platform 1300 structured to execute the instructions of FIGS. 9-11 to implement the cloud platform manager 138 of FIG. 1. The processor platform 1300 can be, for example, a server, a personal computer, a workstation, a self-learning machine (e.g., a neural network), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the cloud manager installer 104, the second communication interface 140, the environment controller 142, the blueprint controller 144, the infrastructure controller 146, the lifecycle controller 148, the database 150, and the blueprint 136a of FIG. 1.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM). Dynamic Random Access Memory (DRAM), RAMBUS® Dynamic Random Access Memory (RDRAM), and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface. Additionally or alternatively, the interface circuit 1220 may include the second communication interface 140.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data Examples of such mass storage devices 1328 include floppy disk drives, hard drive disks, compact disk drives, Blu-ray disk drives, RAID systems, and DVD drives. Additionally or alternatively, the one or more mass storage devices 1328 may include and/or otherwise implement the database 150 and/or the blueprint 136a of FIG. 1.

The machine executable instructions 1332 of FIGS. 9-11 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus, and articles of manufacture have been disclosed that improve cloud management by generating an example cloud manager installer to deploy an example cloud platform manager and, after the cloud platform manager is deployed, embedding a portion and/or an instance of the cloud manager installer in the deployed cloud platform manager. By embedding the example cloud manager installer in the deployed cloud platform manager, lifecycle management of a cloud computing application can be executed by replacing, modifying, or adjusting a stored blueprint by the cloud platform manager. Accordingly, the existing example cloud manager installer can be reused to redeploy one or more virtual resources associated with the cloud computing application instead of generating a new version of the cloud manager installer to redeploy an entirety of the cloud computing application. The disclosed methods, apparatus, and articles of manufacture improve the efficiency of using a computing device by reusing a cloud platform manager installer to redeploy a portion of a cloud computing application using a new or modified blueprint and, thus, reduce downtime associated with upgrading or modifying the cloud computing application. The disclosed methods, apparatus, and articles of manufacture are accordingly directed to one or more improvement(s) in the functioning of a computer.

Example methods, apparatus, systems, and articles of manufacture to improve cloud management are disclosed herein. Further examples and combinations thereof include the following:

Example 1 includes an apparatus for deploying a cloud computing environment, the apparatus comprising at least one processor, and memory including instructions that, when executed, cause the at least one processor to execute a cloud manager installer generated by a container platform manager, the cloud manager installer is to configure a cloud computing environment based on environment information, determine one or more virtual resources based on a blueprint, and deploy a cloud platform manager in the cloud computing environment to manage a lifecycle of an application executing in the cloud computing environment by provisioning the one or more virtual resources to the cloud computing environment, and installing the cloud platform manager in the cloud computing environment by storing the cloud manager installer and the blueprint in the cloud computing environment.

Example 2 includes the apparatus of example 1, wherein the cloud manager installer is to determine one or more physical hardware resources associated with the one or more virtual resources, configure one or more virtual machines based on the one or more physical hardware resources, and provision the one or more virtual machines to the cloud computing environment to execute the application using the one or more physical hardware resources.

Example 3 includes the apparatus of example 1, wherein the cloud manager installer is to in response to obtaining a container from a container database configure the container based on the environment information, and update the blueprint based on the container, and in response to deploying the cloud computing environment, invoke the cloud platform manager to execute the application by executing the container.

Example 4 includes the apparatus of example 1, wherein the cloud manager installer is to in response to a request to modify the blueprint, determine whether the modification is valid, in response to determining that the modification is valid, modify the blueprint, identify a first virtual resource of the one or more virtual resources affected by the modification, the first virtual resource having a first configuration, and redeploy the first virtual resource with a second configuration based on the modification, the second configuration different from the first configuration.

Example 5 includes the apparatus of example 4, wherein the cloud manager installer is to identify a second virtual resource having a dependency on the first virtual resource based on the blueprint, determine that the second virtual resource is to be deployed before the first virtual resource based on the blueprint, and redeploy the second virtual resource before the first virtual resource.

Example 6 includes the apparatus of example 1, wherein the blueprint is a first blueprint, and the cloud manager installer is to in response to the cloud computing environment obtaining a second blueprint, determine whether the second blueprint is different from the first blueprint, in response to determining that the second blueprint is different from the first blueprint, determine that the second blueprint includes modifying a first virtual resource of the one or more virtual resources from a first configuration to a second configuration, in response to determining that the second configuration is valid, replace the first blueprint with the second blueprint, and redeploy the first virtual resource with the second configuration based on the second blueprint.

Example 7 includes the apparatus of example 6, wherein the second blueprint includes modifying a second virtual resource of the one or more virtual resources having the first configuration, and the cloud manager installer is to configure a third virtual resource having the second configuration based on the second blueprint, provision the third virtual resource to the cloud computing environment, transfer a workload from the second virtual resource to the third virtual resource, and decommission the second virtual resource from the cloud computing environment.

Example 8 includes a method for deploying a cloud computing environment, the method comprising executing a cloud manager installer generated by a container platform manager, the cloud manager installer to deploy a cloud computing environment by configuring the cloud computing environment based on environment information, determining one or more virtual resources based on a blueprint, and deploying a cloud platform manager in the cloud computing environment to manage a lifecycle of an application executing in the cloud computing environment by provisioning the one or more virtual resources to the cloud computing environment, and installing the cloud platform manager in the cloud computing environment by storing the cloud manager installer and the blueprint in the cloud computing environment.

Example 9 includes the method of example 8, further including determining one or more physical hardware resources associated with the one or more virtual resources, configuring one or more virtual machines based on the one or more physical hardware resources, and provisioning the one or more virtual machines to the cloud computing environment to execute the cloud computing application using the one or more physical hardware resources.

Example 10 includes the method of example 8, further including in response to obtaining a container from a container database, the application to configure the container based on the environment information, and update the blueprint based on the container, and in response to deploying the cloud computing environment, executing the application by executing the container.

Example 11 includes the method of example 8, further including in response to a request to modify the blueprint, determining whether the modification is valid, in response to determining that the modification is valid, modifying the blueprint, identifying a first virtual resource of the one or more virtual resources affected by the modification, the first virtual resource having a first configuration, and redeploying the first virtual resource with a second configuration based on the modification, the second configuration different from the first configuration.

Example 12 includes the method of example 11, further including identifying a second virtual resource having a dependency on the first virtual resource based on the blueprint, determining that the second virtual resource is to be deployed before the first virtual resource based on the blueprint, and redeploying the second virtual resource before the first virtual resource.

Example 13 includes the method of example 8, wherein the blueprint is a first blueprint, and further including in response to the cloud computing environment obtaining a second blueprint, determining whether the second blueprint is different from the first blueprint, in response to determining that the second blueprint is different from the first blueprint, determining that the second blueprint includes modifying a first virtual resource of the one or more virtual resources from a first configuration to a second configuration, in response to determining that the second configuration is valid, replacing the first blueprint with the second blueprint, and redeploying the first virtual resource with the second configuration based on the second blueprint.

Example 14 includes the method of example 13, wherein the second blueprint includes modifying a second virtual resource of the one or more virtual resources having the first configuration, and further including configuring a third virtual resource having the second configuration based on the second blueprint, provisioning the third virtual resource to the cloud computing environment, transferring a workload from the second virtual resource to the third virtual resource, and decommissioning the second virtual resource from the cloud computing environment.

Example 15 includes a non-transitory computer readable storage medium comprising instructions that, when executed, causes a machine to at least execute a cloud manager installer generated by a container platform manager, the cloud manager installer is to configure a cloud computing environment based on environment information, determine one or more virtual resources based on a blueprint, and deploy a cloud platform manager in the cloud computing environment to manage a lifecycle of an application executing in the cloud computing environment by provisioning the one or more virtual resources to the cloud computing environment, and installing the cloud platform manager in the cloud computing environment by storing the cloud manager installer and the blueprint in the cloud computing environment.

Example 16 includes the non-transitory computer readable storage medium of example 15, wherein the instructions, when executed, cause the machine to determine one or more physical hardware resources associated with the one or more virtual resources, configure one or more virtual machines based on the one or more physical hardware resources, and provision the one or more virtual machines to the cloud computing environment to execute the application using the one or more physical hardware resources.

Example 17 includes the non-transitory computer readable storage medium of example 15, wherein the instructions, when executed, cause the machine to in response to obtaining a container from a container database configure the container based on the environment information, and update the blueprint based on the container, and in response to deploying the cloud computing environment, execute the application by executing the container.

Example 18 includes the non-transitory computer readable storage medium of example 15, wherein the instructions, when executed, cause the machine to in response to a request to modify the blueprint, determine whether the modification is valid, in response to determining that the modification is valid, modify the blueprint, identify a first virtual resource of the one or more virtual resources affected by the modification, the first virtual resource having a first configuration, and redeploy the first virtual resource with a second configuration based on the modification, the second configuration different from the first configuration.

Example 19 includes the non-transitory computer readable storage medium of example 18, wherein the instructions, when executed, cause the machine to identify a second virtual resource having a dependency on the first virtual resource based on the blueprint, determine that the second virtual resource is to be deployed before the first virtual resource based on the blueprint, and redeploy the second virtual resource before the first virtual resource.

Example 20 includes the non-transitory computer readable storage medium of example 15, wherein the blueprint is a first blueprint, and the instructions, when executed, cause the machine to in response to the cloud computing environment obtaining a second blueprint, determine whether the second blueprint is different from the first blueprint, in response to determining that the second blueprint is different from the first blueprint, determine that the second blueprint includes modifying a first virtual resource of the one or more virtual resources from a first configuration to a second configuration, in response to determining that the second configuration is valid, replace the first blueprint with the second blueprint, and redeploy the first virtual resource with the second configuration based on the second blueprint.

Example 21 includes the non-transitory computer readable storage medium of example 20, wherein the second blueprint includes modifying a second virtual resource of the one or more virtual resources having the first configuration, and the instructions, when executed, cause the machine to configure a third virtual resource having the second configuration based on the second blueprint, provision the third virtual resource to the cloud computing environment, transfer a workload from the second virtual resource to the third virtual resource, and decommission the second virtual resource from the cloud computing environment.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for deploying a cloud computing environment, the apparatus comprising:
   at least one memory;
   instructions; and
   at least one processor to execute the instructions to:
      execute a cloud manager installer to:
         configure the cloud computing environment based on environment information;
         determine one or more virtual resources based on a blueprint; and
         provision the one or more virtual resources to the cloud computing environment;
      install a cloud platform manager in the cloud computing environment by embedding the blueprint and an instance of the cloud manager installer in the cloud platform manager;
      modify the blueprint embedded in the cloud platform manager, the modification of the blueprint to change the cloud platform manager;
      redeploy the cloud platform manager based on the modification of the blueprint; and
      cause an execution of the instance of the cloud manager installer of the redeployed cloud platform manager to manage a lifecycle of an application to be executed in the cloud computing environment.

2. The apparatus of claim 1, wherein the cloud manager installer is to:
   determine one or more physical hardware resources associated with the one or more virtual resources;
   configure the one or more virtual machines based on the one or more physical hardware resources; and
   provision the one or more virtual machines to the cloud computing environment to execute the application using the one or more physical hardware resources.

3. The apparatus of claim 1, wherein the cloud manager installer is to:
   in response to obtaining a container from a container database:
      configure the container based on the environment information; and
      update the blueprint based on the container; and
   in response to deploying the cloud computing environment, invoke the cloud platform manager to execute the application by executing the container.

4. The apparatus of claim 1, wherein the cloud manager installer of the cloud platform manager is to:
   in response to a request to modify the blueprint, determine whether the modification is valid;
   in response to a determination that the modification is valid, modify the blueprint;
   identify a first virtual resource of the one or more virtual resources affected by the modification, the first virtual resource having a first configuration; and
   redeploy the first virtual resource with a second configuration based on the modification, the second configuration different from the first configuration.

5. The apparatus of claim 4, wherein the cloud manager installer of the cloud platform manager is to:
   identify a second virtual resource having a dependency on the first virtual resource based on the blueprint;
   determine that the second virtual resource is to be deployed before the first virtual resource based on the blueprint; and
   redeploy the second virtual resource before the first virtual resource.

6. The apparatus of claim 1, wherein the blueprint is a first blueprint, and the cloud manager installer of the cloud platform manager is to:
   in response to the cloud computing environment obtaining a second blueprint, determine whether the second blueprint is different from the first blueprint;
   in response to a first determination that the second blueprint is different from the first blueprint, determine that the second blueprint identifies a modification to a first virtual resource of the one or more virtual resources to change from a first configuration to a second configuration;
   in response to a second determination that the second configuration is valid, replace the first blueprint with the second blueprint; and
   redeploy the first virtual resource with the second configuration based on the second blueprint.

7. The apparatus of claim 6, wherein the modification is a first modification, the second blueprint identifies a second modification of a second virtual resource of the one or more virtual resources having the first configuration, and the cloud manager installer of the cloud platform manager is to:
   configure a third virtual resource having the second configuration based on the second blueprint;
   provision the third virtual resource to the cloud computing environment;
   transfer a workload from the second virtual resource to the third virtual resource; and
   decommission the second virtual resource from the cloud computing environment.

8. A method for deploying a cloud computing environment, the method comprising:
   executing a cloud manager installer to:
      configure the cloud computing environment based on environment information;
      determine one or more virtual resources based on a blueprint; and
      provision the one or more virtual resources to the cloud computing environment;
   deploying a cloud platform manager in the cloud computing environment by embedding the blueprint and an instance of the cloud manager installer in the cloud platform manager;
   modifying the blueprint embedded in the cloud platform manager, the modification of the blueprint to change the cloud platform manager;
   redeploying the cloud platform manager based on the modification of the blueprint; and executing, with the cloud platform manager, the instance of the cloud manager installer of the redeployed cloud platform manager to manage a lifecycle of an application executing in the cloud computing environment.

9. The method of claim 8, further including:
determining one or more physical hardware resources associated with the one or more virtual resources;
configuring the one or more virtual machines based on the one or more physical hardware resources; and
provisioning the one or more virtual machines to the cloud computing environment to execute the application using the one or more physical hardware resources.

10. The method of claim 8, further including:
in response to obtaining a container from a container database, the application to:
configure the container based on the environment information; and
update the blueprint based on the container; and
in response to deploying the cloud computing environment, executing the application by executing the container.

11. The method of claim 8, further including:
in response to a request to modify the blueprint, determining whether the modification is valid;
in response to determining that the modification is valid, modifying the blueprint;
identifying a first virtual resource of the one or more virtual resources affected by the modification, the first virtual resource having a first configuration; and
redeploying the first virtual resource with a second configuration based on the modification, the second configuration different from the first configuration.

12. The method of claim 11, further including:
identifying a second virtual resource having a dependency on the first virtual resource based on the blueprint;
determining that the second virtual resource is to be deployed before the first virtual resource based on the blueprint; and
redeploying the second virtual resource before the first virtual resource.

13. The method of claim 8, wherein the blueprint is a first blueprint, and further including:
in response to the cloud computing environment obtaining a second blueprint, determining whether the second blueprint is different from the first blueprint;
in response to determining that the second blueprint is different from the first blueprint, determining that the second blueprint identifies modifying a first virtual resource of the one or more virtual resources from a first configuration to a second configuration;
in response to determining that the second configuration is valid, replacing the first blueprint with the second blueprint; and
redeploying the first virtual resource with the second configuration based on the second blueprint.

14. The method of claim 13, wherein the second blueprint identifies modifying a second virtual resource of the one or more virtual resources having the first configuration, and further including:
configuring a third virtual resource having the second configuration based on the second blueprint;
provisioning the third virtual resource to the cloud computing environment;
transferring a workload from the second virtual resource to the third virtual resource; and
decommissioning the second virtual resource from the cloud computing environment.

15. A non-transitory computer readable storage medium comprising instructions that, when executed, cause a machine to at least:
execute a cloud manager installer to:
configure a cloud computing environment based on environment information;
determine one or more virtual resources based on a blueprint; and
provision the one or more virtual resources to the cloud computing environment;
deploy a cloud platform manager in the cloud computing environment by embedding the blueprint and an instance of the cloud manager installer in the cloud platform manager;
modify the blueprint embedded in the cloud platform manager, the modification of the blueprint to change the cloud platform manager;
redeploy the cloud platform manager based on the modification of the blueprint; and
execute the instance of the cloud manager installer of the redeployed cloud platform manager to manage a lifecycle of an application to be executed in the cloud computing environment.

16. The non-transitory computer readable storage medium of claim 15, wherein the instructions, when executed, cause the machine to:
determine one or more physical hardware resources associated with the one or more virtual resources;
configure the one or more virtual machines based on the one or more physical hardware resources; and
provision the one or more virtual machines to the cloud computing environment to execute the application using the one or more physical hardware resources.

17. The non-transitory computer readable storage medium of claim 15, wherein the instructions, when executed, cause the machine to:
in response to obtaining a container from a container database:
configure the container based on the environment information; and
update the blueprint based on the container; and
in response to deploying the cloud computing environment, execute the application by executing the container.

18. The non-transitory computer readable storage medium of claim 15, wherein the instructions, when executed, cause the machine to:
in response to a request to modify the blueprint, determine whether the modification is valid;
in response to a determination that the modification is valid, modify the blueprint;
identify a first virtual resource of the one or more virtual resources affected by the modification, the first virtual resource having a first configuration; and
redeploy the first virtual resource with a second configuration based on the modification, the second configuration different from the first configuration.

19. The non-transitory computer readable storage medium of claim 18, wherein the instructions, when executed, cause the machine to:
identify a second virtual resource having a dependency on the first virtual resource based on the blueprint;
determine that the second virtual resource is to be deployed before the first virtual resource based on the blueprint; and
redeploy the second virtual resource before the first virtual resource.

20. The non-transitory computer readable storage medium of claim 15, wherein the blueprint is a first blueprint, and the instructions, when executed, cause the machine to:
    in response to the cloud computing environment obtaining a second blueprint, determine whether the second blueprint is different from the first blueprint;
    in response to a first determination that the second blueprint is different from the first blueprint, determine that the second blueprint identifies a modification of a first virtual resource of the one or more virtual resources from a first configuration to a second configuration;
    in response to a second determination that the second configuration is valid, replace the first blueprint with the second blueprint; and
    redeploy the first virtual resource with the second configuration based on the second blueprint.

21. The non-transitory computer readable storage medium of claim 20, wherein the modification is a first modification, the second blueprint identifies a second modification of a second virtual resource of the one or more virtual resources having the first configuration, and the instructions, when executed, cause the machine to:
    configure a third virtual resource having the second configuration based on the second blueprint;
    provision the third virtual resource to the cloud computing environment;
    transfer a workload from the second virtual resource to the third virtual resource; and
    decommission the second virtual resource from the cloud computing environment.

* * * * *